US011625010B2

(12) United States Patent
Thorpe et al.

(10) Patent No.: US 11,625,010 B2
(45) Date of Patent: Apr. 11, 2023

(54) PROCESS CONTROL SYSTEM AND METHOD

(71) Applicant: SPIRO CONTROL LTD, Frodsham (GB)

(72) Inventors: Patrick John Thorpe, Frodsham (GB); Shabroz Gill, Frodsham (GB)

(73) Assignee: SPIRO CONTROL LTD, Frodsham (GB)

( * ) Notice: Subject to any disclaimer, the term of this patent is extended or adjusted under 35 U.S.C. 154(b) by 414 days.

(21) Appl. No.: 16/960,759

(22) PCT Filed: Jan. 8, 2019

(86) PCT No.: PCT/GB2019/050040
§ 371 (c)(1),
(2) Date: Jul. 8, 2020

(87) PCT Pub. No.: WO2019/138215
PCT Pub. Date: Jul. 18, 2019

(65) Prior Publication Data
US 2020/0348633 A1  Nov. 5, 2020

(30) Foreign Application Priority Data

Jan. 10, 2018  (GB) ...................... 1800389

(51) Int. Cl.
*G05B 13/04* (2006.01)
*G05B 15/02* (2006.01)

(52) U.S. Cl.
CPC .......... *G05B 13/048* (2013.01); *G05B 15/02* (2013.01)

(58) Field of Classification Search
CPC .............. G05B 13/048; G05B 15/02
See application file for complete search history.

(56) References Cited

U.S. PATENT DOCUMENTS 6,263,255 B1 * 7/2001 Tan .................. G06Q 50/12
700/121
2004/0075689 A1  4/2004 Schleiss et al.
(Continued)

FOREIGN PATENT DOCUMENTS

JP       2007226430 A       9/2007
KR       20050074561     *  7/2015  ........... G05B 19/418
WO       WO-03025685 A1  *  3/2003  ........... G05B 13/027

OTHER PUBLICATIONS

International Search Report and Written Opinion from PCT Application No. PCT/GB2019/050040, dated Mar. 20, 2019.

(Continued)

*Primary Examiner* — Ronald D Hartman, Jr.
(74) *Attorney, Agent, or Firm* — Workman Nydegger

(57) ABSTRACT

A process control system for controlling a process including a plurality of sub-processes, the process control system including a plurality of control modules each associated with one of the plurality of sub-processes. At least one of the plurality of control modules includes a model, a communicator, and a controller. The model includes a sub-process model defining a relationship between variables of the associated sub-process, and an inter-sub-process model defining a relationship between a variable of another sub-process and at least one of the variables of the associated sub-process. The communicator communicates with control module associated with the another sub-process to determine an updated value for the variable of the another sub-process. The controller uses the model and the updated value to determine a control signal for adjusting a manipulated variable of the associated sub-process. The process control method is also provided that is performed by the process control system.

16 Claims, 7 Drawing Sheets

(56) References Cited

U.S. PATENT DOCUMENTS

| | | | |
|---|---|---|---|
| 2006/0189009 A1 | 8/2006 | Ahn et al. | |
| 2006/0227350 A1* | 10/2006 | Crawford | G05B 19/4185 |
| | | | 358/1.12 |
| 2006/0235563 A1* | 10/2006 | Parikh | G05B 19/41875 |
| | | | 700/121 |
| 2008/0027704 A1* | 1/2008 | Kephart | G05B 19/41885 |
| | | | 703/22 |
| 2009/0089024 A1 | 4/2009 | Huang et al. | |
| 2009/0089030 A1 | 4/2009 | Sturrock et al. | |
| 2011/0131017 A1 | 6/2011 | Cheng et al. | |
| 2011/0295554 A1* | 12/2011 | Baek | H01L 21/3065 |
| | | | 703/2 |

OTHER PUBLICATIONS

Search Report from corresponding GB Application No. 1800389.7, dated Jun. 25, 2018.

* cited by examiner

PROCESS CONTROL SYSTEM AND METHOD

The present invention is directed towards a process control system and method for controlling a process, and in particular a process comprising a plurality of sub-processes.

BACKGROUND

A process receives inputs and produces outputs. The inputs can include manipulated variables that can be adjusted by a process control system. The outputs can include controlled variables that are dependent on the manipulated variables. The process control system may operate to adjust the manipulated variables to maintain the controlled variables at a target value or within some desired range of values. This adjustment may be subject to restrictions on the range or rate of the manipulated variable movement. The inputs for the process can also include disturbance variables that affect the process outputs but cannot be adjusted by the process control system. The process control system may take account of the current and future effect of these measured disturbances on the controlled variables and make appropriate corrective action on the manipulated variables to keep the controlled variables at the target value or within the desired range of values.

An objective of a process control system is to automate the control of a process. It is further generally desired that the process control system controls the process in an optimal way, for example by minimising the amount of energy consumed, minimising environmental emissions, minimising the use of an expensive raw material or maximising the production of a profitable product. The process control system achieves this by adjusting the manipulated variables in a coordinated manner to improve a defined cost function. This optimisation may need to take into account limits imposed on manipulated variables and controlled variables and typically the optimal point will be located at a combination of these limits.

Referring to FIG. 1, an existing approach for achieving the control and optimisation objectives simultaneously is model based predictive control. In this existing approach, the process control system comprises a model based predictive controller 100 comprising: a state estimator 101; a steady state optimiser 103, and a dynamic optimiser 105. These three components of the controller 100 share a common process model which defines the relationships that exist between the manipulated variables and disturbance variables with the controlled variables for the process 107.

The state estimator 101 operates to determine the current state of the process 107. This determination may take into account measurement noise, measurement uncertainty, and system disturbances. The steady state optimiser 103 operates to determine the optimal feasible future state for the process 107. The dynamic optimiser 105 operates to formulate a plan, expressed as a series of manipulated variable moves, e.g., a manipulated variable move trajectory, to transfer the system from the current state to the optimal feasible future state.

In process control, and in particular process control for large, industrial, processes, there will typically be a number of sub-processes within the process. Each sub-process will have manipulated and controlled variables.

Referring to FIG. 2, one existing approach for controlling such a process, uses a single model based predictive controller 100 that incorporates all of the manipulated and controlled variables for all of the sub-processes. The manipulated and controlled variables for these sub-processes may be measured/actuated using actuators/sensors 109a-109e. This approach accounts for all of the interactions between variables in the process, but this single model based predictive controller 100 can be difficult to maintain. This is especially the case when the process is very large, with many manipulated and controlled variables, or where the sub-processes are geographically dispersed over a wide area, such as a utility network.

In another existing approach for controlling such a process, several independent model based predictive controllers are provided. Each of these independent model based predictive controllers is associated with a sub-process and controls the sub-process independently of the other controllers. These individual controllers may be easier to configure and maintain than the single model based predictive controller described above, but the resulting control may be unstable and unable to achieve the global optimum.

US Patent Application Publication No. 2011/0131017 A1 to Cheng et al., US Patent Application Publication No. 2009/0089030 A1 to Sturrock et al., and JP Patent Application Publication No. 2007226430 all relate to methods and systems for simulating the operation of an industrial plant. US Patent Application Publication No. 2004/0075689 A1 to Schleiss et al. discloses an operator interface and an execution method that detects conditions within the plant such as whether a leakage has occurred. US Patent Application Publication No. 2009/0089024 A1 to Huang et al. discloses methods and arrangements for creating models for fine-tuning recipes, The present invention relates to a process control system and method for controlling a process.

US Patent Application Publication No. 2006/0189009 discloses a central semiconductor process controlling apparatus that controls, via a single controller, a plurality of semiconductor processing devices.

It is an object of the invention to improve on the existing approaches for controlling processes comprising a plurality of sub-processes, or at least provide an alternative to these existing approaches.

SUMMARY

According to the present disclosure there is provided a process control system and method as set forth in the appended claims. Other features of the invention will be apparent from the dependent claims, and the description which follows.

According to aspects of the present invention there is provided a process control system for controlling a process comprising a plurality of sub-processes, the process control system comprising a plurality of control modules each associated with one of the plurality of sub-processes, wherein at least one of the plurality of control modules comprises:

a model comprising a sub-process model defining a relationship between variables of the associated sub-process, and an inter-sub-process model defining a relationship between a variable of another sub-process and at least one of the variables of the associated sub-process; a communicator operable to communicate with a control module associated with the another sub-process so as to determine an updated value for the variable of the another sub-process; and a controller operable to use the model and the updated value to determine a control signal for adjusting a manipulated variable of the associated sub-process.

Here, a "model" may define the relationship between one or more controlled variables with one or more manipulated variables and disturbance variables. The model may be in the form of a response matrix defining the dynamic response of each controlled variable to a change in each manipulated variable and disturbance variable. The model may be a time series model that supports a multi-input, multi-output structure including state space, autoregressive exogenous (ARX), finite impulse response (FIR), and transfer functions. The model may define the relationship between variables, and therefore may define an objective function to be minimised by the controller. This optimisation problem may be solved using any appropriate constrained optimisation technique such as an interior point method.

The control module has an allocated model that may represent a sub-section of the complete process. The model includes a sub-process model that may define the relationships that exist between the manipulated variables and/or disturbance variables of the control module with the sub-process controlled variables. Additionally, the model includes an inter-sub-process model that may represent the interactions between sub-processes. The inter-sub-process model may show the relationships that exist between manipulated variables and/or controlled variables in other control modules with those in the subject control module. The module may be implemented in software, hardware, or a combination of hardware and software.

The variables of the associated sub-process may comprise one or more of a manipulated variable, a controlled variable, and a disturbance variable.

Here, a manipulated variable of the associated sub-process represents an input for the associated sub-process that may be controlled by the control module for the associated sub-process. The input of the associated sub-process may be controlled by an actuator that is part of, or separate from, but communicatively coupled to the control module. The control signal for adjusting the manipulated variable of the associated sub-process may act to control the actuator to change the input to the associated sub-process based on the control signal. That is, the control module may control the actuator based on the control signal.

Here, a controlled variable of the associated sub-process represents an output for the associated sub-process that is desired to be controlled by the controlled system. The controlled variable may be measured by a sensor that is part of, or separate from, but communicatively coupled to the control module. The measurements of the controlled variable may be used to determine how the manipulated variable may be varied, that is by considering any relationships between the manipulated variable and the controlled variable in the associated sub-process model.

Here, a disturbance variable of the associated sub-process represents a variable that affects the sub-process but may not be adjusted by the controller. The controller may take account of the effect of the disturbance variable on the controlled variables by using the inter-sub-process model. The controller may determine an appropriate control signal for controlling the manipulated variable based on the effect caused by the disturbance variable.

According to the first aspect of the invention, rather than using a single, centralised control solution, multiple control modules are used in a distributed arrangement. Further, the multiple local control modules are not independent, and instead may communicate with one another and operate in a cooperative manner. This enables the control modules to achieve a shared objective function which approaches the global optimum even when significant interactions are present. In other words, the control modules are operable to communicate with one another in a cooperative manner to solve a shared objective function for the process.

In particular, by providing the inter-sub-process model and the communicator, the controller of the control module is able to take into account the updated value of the variable of the another sub-process, and use this information to determine how to adjust the manipulated variable of the associated sub-process. This enables the control module to cooperate with the another control module so as to provide the benefits of a distributed cooperative process control system.

The plurality of control modules may be communicatively coupled to one another and may be capable of optimising their respective sub-processes while also communicating and cooperating in real-time with other ones of the control modules. This may provide benefits for processes that have multiple sub-processes that are interlinked, e.g. through a network of material, energy, and/or information streams. The process control system creates the potential for energy savings and capacity utilisation through material recycle and energy integration in these processes.

The controller may be operable to determine and output the control signal for adjusting a manipulated variable of the associated sub-process, e.g. to an actuator. The process control system may comprise an actuator for controlling the manipulated variable of the associated sub-process. The actuator may be operable to receive the control signal and control the manipulated variable based on the received control signal.

The process control system may comprise a sensor for measuring at least one of the variables of the associated sub-process. The sensor may be operable to measure at least one of manipulated variables, controlled variables, and disturbance variables of the associated sub-process. The control module may be operable to retrieve measurement data for at least one of the variables of the associated sub-process from the sensor. The controller may be operable to use the measurement value in the determination of the control signal.

The control modules within the process control system may cooperate so that all control modules may work together in a coordinated manner to control the process to reach a desired optimum state. Cooperation between control modules may help ensure stability for the process and may enable the best feasible global optimum to be achieved.

Unlike the existing centralised control approach, the process control system of the present invention does not require a complex infrastructure, which may be difficult and expensive to configure and maintain. For example, for a large process, a centralised controller will include hundreds of variables and will incur a high computational load. Further, there may be large communication strain on the network because data needs to be communicated for the hundreds of variables to the centralised controller. Further still, the centralised controller may use a centralised model that is inflexible and intolerant to changes in the underlying process. For example, if one sub-process is offline then this may invalidate the centralised model. For centralised control, as the size of the centralised controller increases, the time during which the process is on-line may be expected to decrease and the overall benefit provided by the process control system (e.g. in energy savings and improved product quality) may be expected to go down.

Further, unlike the existing independent control module approach, the control modules of the present invention are able to communicate with one another to achieve a process-wide optimisation. In other words, the process control system of the present invention is a distributed cooperative process control system that achieves the benefits of process-wide optimisation without the complexity and low fault tolerance of centralised control.

Compared to centralised control, the individual computational effort of each control module may be low. In addition, a centralised coordinator may not be required for real time control. If errors occur in a sub-process, the other control modules may still be able to operate and optimise.

The variables for the process may be configured independently to the control modules. This may allow greater flexibility in terms of the control module structure, and/or it may also allow variables to be added to or removed from the process control system in a simple plug and play manner, without any additional user reconfiguration or disruption to the operation of the process control system.

Here, plug and play may mean that the process control system is able to add a new component such as a module, manipulated variable, controlled variable or disturbance variable into the process control system and for the process control system to self-reassemble in such a way that the new component is automatically assimilated. This means that a new sub-process, variable, or control module may be added to the process control system without the need to re-design existing control modules. Instead, it may be sufficient to define new information streams between interacting control modules. Compared to developing a complex centralised control scheme, the implementation costs have the potential to be significantly lower due to less engineering hours and lower hardware and software costs. Moreover, due to higher reliability and availability, the benefits may be sustained for more of the available time.

The process control system may be configured to detect a new variable automatically. The detection may be based on an identifier for the variable. Significantly, adding the new variable into the process control system does not require significant user involvement.

The sub-process model may define a relationship between the manipulated variable of the associated sub-process and a controlled variable of the associated sub-process. The sub-process model may define a relationship between a disturbance variable of the associated sub-process and the controlled variable of the associated sub-process. The sub-process model may define the relationships between all variables assigned to the control module and associated with the associated sub-process.

The inter-sub-process model may define a relationship between a manipulated variable or a controlled variable of the another sub-process and at least one of the variables of the associated sub-process. The inter-sub-process model may define all the relationships between the variables assigned to the control module and associated with the associated sub-process and variables of other ones of the plurality of sub-processes that are linked to the associated sub-process.

The inter-sub-process model may define the relationship between variables of the another sub-process that affect or are affected by at least one of the variables of the associated sub-process. The communicator may be operable to communicate with the control module associated with the another sub-process so as to determine updated values for the variables of the another sub-process included in the inter-sub-process model. The controller may be operable to use the model and the updated values to determine the control signal for adjusting the manipulated variable of the associated sub-process.

The communicator may be operable to transmit information regarding the control signal for adjusting the manipulated variable of the associated sub-process to the control module associated with the another sub-process. The control module associated with the another sub-process may have the same or similar structure to the control module of the associated sub-process. The control module associated with the another sub-process may be operable to use the information and a model to determine a control signal for adjusting a manipulated variable of the another sub-process. That is, the control modules can exchange information and use this exchange of information and their respective models to determine their respective control signals.

The inter-sub-process model may define the relationship between variables of a group of the sub-processes that affect or are affected by at least one of the variables of the associated sub-process. The communicator may be operable to communicate with the control modules associated with the group of the sub-processes so as to determine updated values for the variables of the group of the sub-process included in the inter-sub-process model. The controller may be operable to use the model and the updated values to determine the control signal for adjusting the manipulated variable of the associated sub-process.

The communicator may be operable to transmit information regarding the control signal for adjusting the manipulated variable of the associated sub-process to the group of control modules associated with the group of sub-processes. Each of the control modules of the group of control modules may be operable to use the information and a model to determine a control signal for adjusting a manipulated variable of a sub-process in the group of sub-processes associated with the control module.

The variable of the another sub-process may be a manipulated variable, and the updated value may be a move trajectory for the manipulated variable of the another sub-process.

The controller may be operable to use the model and the updated value to determine a move trajectory for the manipulated variable of the associated sub-process.

The controller may be operable to use the move trajectory for the manipulated variable of the associated sub-process to determine the control signal for adjusting the manipulated variable of the associated sub-process.

The communicator may be operable to communicate the move trajectory for the manipulated variable of the associated sub-process to the another control module. The communicator may be operable to receive a move trajectory for the manipulated variable of the another sub-process from the another control module. The controller may be operable to determine a new manipulated variable move trajectory using the model and the received move trajectory for the manipulated variable of the another sub-process.

The process control system may be operable to execute a plurality of control cycles. During each control cycle, the communicator may be operable to communicate with the control module associated with the another sub-process so as to determine an updated value for the variable of the another sub-process. The controller may be operable to use the model and the updated value to determine the control signal for adjusting a manipulated variable of the associated sub-process. The communicator may, during each control cycle, further be operable to transmit information regarding the control signal for adjusting the manipulated variable of the associated sub-process to the control module associated with the another sub-process.

The control cycle may comprise a plurality of iterations. During each iteration, the control module may be operable to communicate with the control module associated with the another sub-process such as to transmit information regarding the control signal for adjusting the manipulated variable of the associated sub-process and/or to receive an updated value from the another control module. The number of iterations per control cycle may be determined by at least one of the available execution time, whether a pre-set total iteration count is reached or whether a convergence criteria is achieved.

During each iteration, the controller may be operable to solve the shared objective function for the process as an optimisation problem using the manipulated variable of the associated sub-process as an independent variable, and the updated value from the another control module as a disturbance variable. The updated value may be a manipulated variable move trajectory. The optimisation problem may be solved subject to limit constraints on the controlled and manipulated variables and variable tuning parameters. The manipulated variables may be optimisation variables that are adjusted by the controller to achieve the optimal feasible solution. The controlled variables may be dependent variables that move as a result of changes to the optimisation variables. The model defines the relationship between the controlled and manipulated variables, therefore the model, optionally along with the tuning weights, defines the objective function that is minimised by the controller. The optimisation problem may be solved using an appropriate constrained optimisation technique such as an interior point method.

The optimisation problem may be solved subject to one or more constraints such as hard manipulated variable constraints and soft controlled variable constraints. The hard constraints may define the range within which the variable can be moved and may define the maximum absolute move within each control cycle. The soft constraints may be relaxed by the optimisation algorithm using established techniques.

Additional requirements may be enforced in the solution of the optimisation problem to establish closed loop stability. For example, in some implementations the control horizon must be sufficiently long to stabilize unstable modes at the end of the horizon. In other implementations terminal penalty or terminal region constraints on unstable modes are adopted using established techniques. All variables may be subject to tuning parameters which define the penalty cost control weights. Collectively these limits and tuning parameters along with the model define the objective function for each control module. Each controller may solve a control problem at each control cycle which entails minimisation of the objective function.

The process control system may be operable to execute a plurality of control cycles, each control cycle comprising a plurality of iterations, and wherein during each iteration, the control module may be operable to communicate with the control module associated with the another sub-process to receive an updated value from the another control module, and use the model and the updated value to determine the control signal for adjusting a manipulated variable of the associated sub-process. During each iteration, the controller may be operable to solve a shared objective function for the process as an optimisation problem using the manipulated variable of the associated sub-process as an independent variable, and the updated value from the another control module as a disturbance variable.

The control cycle may start by initialising the manipulated variable move trajectory to $v(0)$ and set a prior feasible iteration to $v(p)=v(0)$. The initialisation may have an important effect on the optimisation convergence rate for the shared objective function. The initialisation may be achieved by a warm start method in which the initial manipulated variable move trajectory is set equal to the optimal design from a previous control cycle, with the trajectory shifted by one-time step. The value at the last step may be chosen in a variety of ways, such as by setting it to the target value, the linear-quadratic regulator (LQR) control move or by maintaining the value from the previous control cycle. In an alternative arrangement, initialisation may be achieved using an LQR controller designed using well known methods. The cost resulting from the LQR trajectory may be compared to the warm start cost and the lower of the two options is selected. The LQR trajectory may be generated sequentially using the central feedback gain, manipulated variable hard constraints are imposed by clipping the trajectory using will understood methods.

During each iteration, the optimisation solution given by solving the optimisation problem may provide a new manipulated variable move trajectory as a new feasible iteration $v(*)$. Given the prior feasible iteration $v(p)$ and new iteration $v(*)$ the next iteration $v(p+1)$ may be calculated as a weighted sum of $v(p)$ and $v(*)$. If a termination condition is reached then the optimal solution may be set to $v=v(p+1)$ and the control cycle exits, otherwise the controller sets $v(p)=v(p+1)$ and performs a new iteration.

The control limits and tuning parameters may be consistent and/or constant for the entire process control system, even when variables are shared between separate control modules. This consistency, coupled with the interactions that exist between the sub-systems may lead to a shared objective function.

The shared objective function may be subject to validity limits on controlled variables that may represent physical limits on the range of the associated sensor. If strictly enforced, these physical limits may, in some implementations, result in infeasibility of the control optimisation. To ensure feasibility and convergence of cooperative iterations, the hard validity limits may be represented by an appropriate smooth barrier function using well known methods such as the Kreisselmeier-Steinhauser function.

The controller may be a model based predictive controller. The controller, which may be a model based predictive controller, may comprise one or more of a state estimator, steady-state optimiser, and dynamic optimiser. The controller may comprise a state estimator operable to determine state information indicating the current state of the associated sub-process. The controller may be operable to use the state information, the model, and the updated value to determine the control signal for adjusting a manipulated variable of the associated sub-process. The state estimator may use new information that is available from sensors for controlled variables and/or measured disturbances to estimate the current state of the system. The state estimator may be operable to use an updated value for a variable of the associated sub-process and the model to determine the state information. The state estimator may be operable to use an updated value for an output variable, such as a controlled variable, of the associated sub-process, and/or an updated value for an input variable, such as a manipulated variable, of the associated sub-process to determine the state information. This state estimation may take the form of a simple bias update method or a more complex state estimation using an optimal Kalman filter or similar established techniques.

The controller may comprise a steady-state optimiser operable to determine a desired future state of the associated sub-process. The steady-state optimiser may use the state information to determine the desired future state of the associated sub-process. The controller may be operable to use the state information, the desired future state of the associated sub-process, the model, and the updated value to determine the control signal for adjusting a manipulated variable of the associated sub-process.

The state estimation and steady-state optimisation problems for the process control system may be solved separately in each controller. This avoids the requirement for centralised estimation and steady state target optimisation and allows each controller to operate autonomously.

The process control system may be operable to perform a watchdog function to ensure that the state estimation and steady-state optimisation solutions in each controller remain in synchronisation. The watchdog function may have defined tolerances.

The controller may comprise a dynamic optimiser. The dynamic optimiser may be operable to use the model and the updated value to determine the control signal for adjusting a manipulated variable of the associated sub-process. The dynamic optimiser may be operable to use a sub-set of the model to determine the control signal for adjusting a manipulated variable of the associated sub-process. The sub-set of the model may include only controlled variables that have models linked to manipulated variables associated with the control module, other controlled variables, e.g. those that do not have a model or only have a non-cooperative model with the manipulated variables associated with the control module may not be included in the sub-set of the model. The sub-set of the model may be defined by disabling redundant controlled variables in the model.

The controller may be further operable to use information regarding coupled constraints between the associated sub-process and the another sub-process to determine the desired future state of the associated sub-process. A coupled constraint may be, for example, a resource shared by two or more of the sub-process, and which the process control system controls the distribution thereof. There then exists an availability constraint spanning these two sub-processes. This constraint is coupled because each local resource constraint depends on the amount requested by the other sub-process. If coupled constraints are present, but not taken account of, the process control system may provide stable but sub-optimal control. However, and significantly, by taking into account the coupled constraints when determining the desired future state the process control system is able to mitigate the effect of coupled constraints and take them into account when determining the optimal state for the associated sub-process. The coupled constraints may be included in the model. The shared constraint problem may be resolved by designing the model in each local control module such that consistent steady state solutions are provided. For example, when the controllers are model based predictive controllers, the state estimation and steady state optimisation problems may be arranged to be consistent between the controllers of the control modules and the controllers may have an equivalent data set. As such, the local solutions for the relevant controllers may be consistent. This is beneficial for resolving shared resource constraints as, without this step, the controllers may compete over the shared constraint and the resulting control may not be stable or optimal.

The model may comprise a cooperative model and a non-cooperative model. The non-cooperative model may define a relationship between a manipulated variable and a controlled variable that will not be used to control the controlled variable. Any model may be optionally defined as either a cooperative model or a non-cooperative model provided that each manipulated variable for the process has at least one cooperative model. If a model is defined as being non-cooperative, this means that the corresponding manipulated variable acts as a disturbance variable for the controller. That is, the move trajectory of the manipulated variable in the non-cooperative model is used for disturbance in the controller and is not used for control. This approach may be beneficial in simplifying the tuning and stability of the process control system.

The process control system may further comprise a storage unit arranged to store information shared by the plurality of control modules. The plurality of control modules may be in communication with the storage unit. The information may comprise at least one of control limits, engineer limits, and validation limits for all controlled and manipulated variables, and validation limits for all measured disturbance variables. The information may comprise relevant tuning parameters for these variables. The relevant tuning parameters may comprise at least one of tuning weights, economic costs, and economic ranks. Holding this information in a common storage unit may be beneficial as it helps ensure that each controller maintains a consistent copy of the relevant parameters and helps ensure that each controller operates with a consistent and common objective function. The redundancy and error tolerance may be improved by replicating the storage unit in at least one of, and preferably all of the control modules within the process control system.

The process control system may further comprise a central configurator. The central configurator may be operable to generate a centralised model defining the interactions between variables in the process. The model may be derived from the centralised model. The central configurator may be operable to derive the model for the control module, and preferably for all of the control modules of the process control system.

The central configurator may be operable to update the centralised model in response to a variable or a control module being added to or removed from the process control system. In one example, the sub-process model and the inter-sub-process model may be provided by a user. The central configurator may be operable to assemble the sub-process model and the inter-sub-process model into the centralised model. The user may be an application engineer, and may define the models using known model identification techniques such as least squares linear regression. In another example, models associated with a controlled variable or a group of controlled variables may be provided by the user. The models may be provided as a collection of single input—single output or multi input—multi output models. The central configurator may then be operable to assemble the centralised model using the provided models. In this example, if a new control module preconfigured with variables and associated sub-process and inter-sub-process models is added to the process control system, the central configurator may be operable to assemble the newly added models into the centralised model.

In another example, the central configurator may be operable to learn aspects of the centralised model using a model identification algorithm. The model identification algorithm may comprise receiving input data from a controller of a control module and applying a model identification function to the input data to generate the aspects of the centralised model. The controller may be operable to superimpose a sequence of low amplitude steps into the move trajectory for the controller in order to provide the input data. The model identification function may use a closed loop identification algorithm such as recursive least squares.

The process control system may not be required to comprise a central configurator, and in some examples no central configurator is employed. In these examples, the models may be assembled on each module by retrieving model relationship information from the communication network. The central configurator may operate asynchronously. The central configurator may operate when a control module or variable for the process is added or removed from the process control system. The central configurator may operate when an initialisation request is triggered by a control module or on the central configurator itself. The central configurator may not operate at other times.

In response to the central configurator being triggered to operate, the central configurator may perform at least one of the following tasks: generate the centralised model; perform a consistency check on the centralised model; determine an optimum segregation of the centralised model based on model interactions; form a new model for one or more of the control modules; transmit the new model to the relevant control module;

The structure of the controller may be defined by the manipulated variables assigned to the controller. The manipulated variables may be assigned by the user, or may be determined automatically by the central configurator. The central configurator may assign the manipulated variables based on an optimum design algorithm intended to minimise the overall network communication. Once the manipulated variables are assigned to a controller, the process control system may be operable to apply an algorithm to determine the assignment of controlled variables and disturbance variables based on the interactions that are defined in the centralised model.

The variables may be defined independently to the controllers. This may provide greater flexibility in terms of the controller structure.

The process control system may be operable to receive new variables and/or remove existing variables in a plug and play manner. The new variable may be in the form of a function block instance corresponding to the variable type. This is in particular if the process control system is implemented using the IEC 61131 or IEC 61499 architectures.

Each of the control modules may comprise a communicator such that the control modules are able to communicate with one another over a communication network. Variable data, e.g. as measured by sensors of the process control system, may be made available to all of the control modules and other components of the process control system over the communication network.

Each of the plurality of control modules may comprise: a model comprising a sub-process model defining a relationship between variables of the associated sub-process, and an inter-sub-process model defining a relationship between a variable of another sub-process and at least one of the variables of the associated sub-process; a communicator operable to communicate with a control module associated with the another sub-process so as to determine updated values for the variable of the another sub-process; and a controller operable to use the model and the updated value to determine a control signal for adjusting a manipulated variable of the associated sub-process.

The variables of the process may each be assigned an identifier so as to link the variables to subscribers in the communication network.

The process control system may comprise a message broker. The message broker may facilitate communication between control modules. The control modules may communicate through messages which may contain packets of information. The message broker may be the central hub through which the messages pass through. The message broker may be responsible for receiving and filtering messages, deciding which subscribers are interested in which messages and then sending the message to all subscribed control modules. Another responsibility of the message broker may be the authentication and authorization of control modules. A process control system may comprise a plurality of message brokers such that one broker can act as a subscriber to another. This may improve the redundancy and error tolerance within the network.

The controller of the control module may be derived from a plurality of proportional integral derivative, PID, controllers. Large processes may be controlled by a plurality of independent single-input single output controllers using a PID algorithm having one measured variable and one actuated variable. Significantly, the process control system of the present invention enables the automated configuration of the controller from a series of PID controllers. In one example, a user may provide a list of the PID controllers that are intended to participate in the controller. The measured process value of each PID controller may be assigned as a controlled variable in the controller. The actuated variable of each PID controller may be assigned as a manipulated variable in the controller. The model may be formed as a block diagonal where each diagonal block is the dynamic response between the actuated variable and measured variable of each independent PID controller. These response models may be provided directly by the user or may be determined automatically by established closed loop model identification methods. The model for the controller includes the sub-process and inter-sub-process models.

The process control system may be implemented using an IEC 61131 architecture or an IEC 61499 architecture. The IEC 61131 is a widely used international standard for programming industrial process control systems and building automation systems. The standard defines five programming languages including a procedural language (structured text) and a graphical language (function block diagrams). IEC 61499 is an extension of IEC 61131 in which the cyclic execution model of IEC 61131 is replaced by an event driven execution model. One way in which the process control system may be configured in an industrial process control system is with the IEC 61131 industrial standard. In this implementation, each component in the cooperative control network (e.g. controller, manipulated variable, controlled variable, disturbance variable, data store) may be implemented as a separate IEC 61131 function block instance. Each local controller along with associated variables and data store on a control module may be configured as a single IEC 61131 application. Communication between applications may use a publish-subscribe model with the individual function block instances acting as clients subscribing to a network message broker. This data model allows communication between function block instances which may reside on separate hardware devices or within separate IEC 61131 applications.

IEC 61499 enables an application-centric design, in which a single application, defined by a network of interconnected function blocks, can be distributed across multiple devices. The distribution of an application is described by a mapping model which enables an application to be distributable but maintained as a common unit. The process control system fits within the IEC 61499 framework. The components in the process control system may be implemented as separate IEC 61499 function block instances. Function blocks may reside on separate devices. The distributed cooperative process control system may be defined as a single distributed application within the IEC 61499 mapping model.

The process may be an industrial process, e.g. in an industrial plant. The sub-processes may be geographically dispersed. The control modules may be connected to one another over a communication network. The communication network may be a wired or wireless communication network.

The control modules may be separate physical hardware modules on a common communication network. Alternatively, all of the control modules can reside on the same hardware module. The control modules may be geographically separate from one another, the geographical separation may be over large distances, such as in a utility network. That is, the control modules may be separate from one another by more than one metre, and may be several or hundreds of miles apart. When the control modules are geographically separate, it may be beneficial to employ a secure internet connection.

In other words, there is provided a process control system for controlling a process comprising a plurality of sub-processes, the process control system comprising a plurality of control modules each associated with one of the plurality of sub-processes, wherein at least one of the control modules is operable to communicate with another of the control modules and work together in a coordinated manner with the another control module so as to determine a control signal for adjusting the sub-process associated with the control module.

According to a second aspect of the invention, there is provided a process control method for controlling a process comprising a plurality of sub-processes, the process control method performed by a control module associated with one of the plurality of sub-processes, wherein the method comprises:
providing a model comprising a sub-process model defining a relationship between variables of the associated sub-process, and an inter-sub-process model defining a relationship between a variable of another sub-process and at least one of the variables of the associated sub-process; receiving, from another control module associated with the another sub-process, an updated value for the variable of the another sub-process; using the model and the updated value to determine a control signal for adjusting a manipulated variable of the associated sub-process.

All of the features of the first aspect, either alone or in combination, may be performed by the process control method of the second aspect. The method may be performed by the process control system of the first aspect of the invention.

In other words, there is provided a process control method for controlling a process comprising a plurality of sub-processes, the process control system comprising a plurality of control modules each associated with one of the plurality of sub-processes, wherein the process control method comprises at least one of the control modules is operable to communicate with another of the control modules and work together in a coordinated manner with the another control module so as to determine a control signal for adjusting the sub-process associated with the control module.

According to a third aspect of the invention, there is provided a computer readable medium having instructions recorded thereon which, when executed by a processor device, cause the processor device to perform the method of the second aspect of the invention.

BRIEF DESCRIPTION OF THE DRAWINGS

For a better understanding of the invention, and to show how embodiments of the same may be carried into effect, reference will now be made, by way of example only, to the accompanying diagrammatic drawings in which.

DETAILED DESCRIPTION

Figure 3:
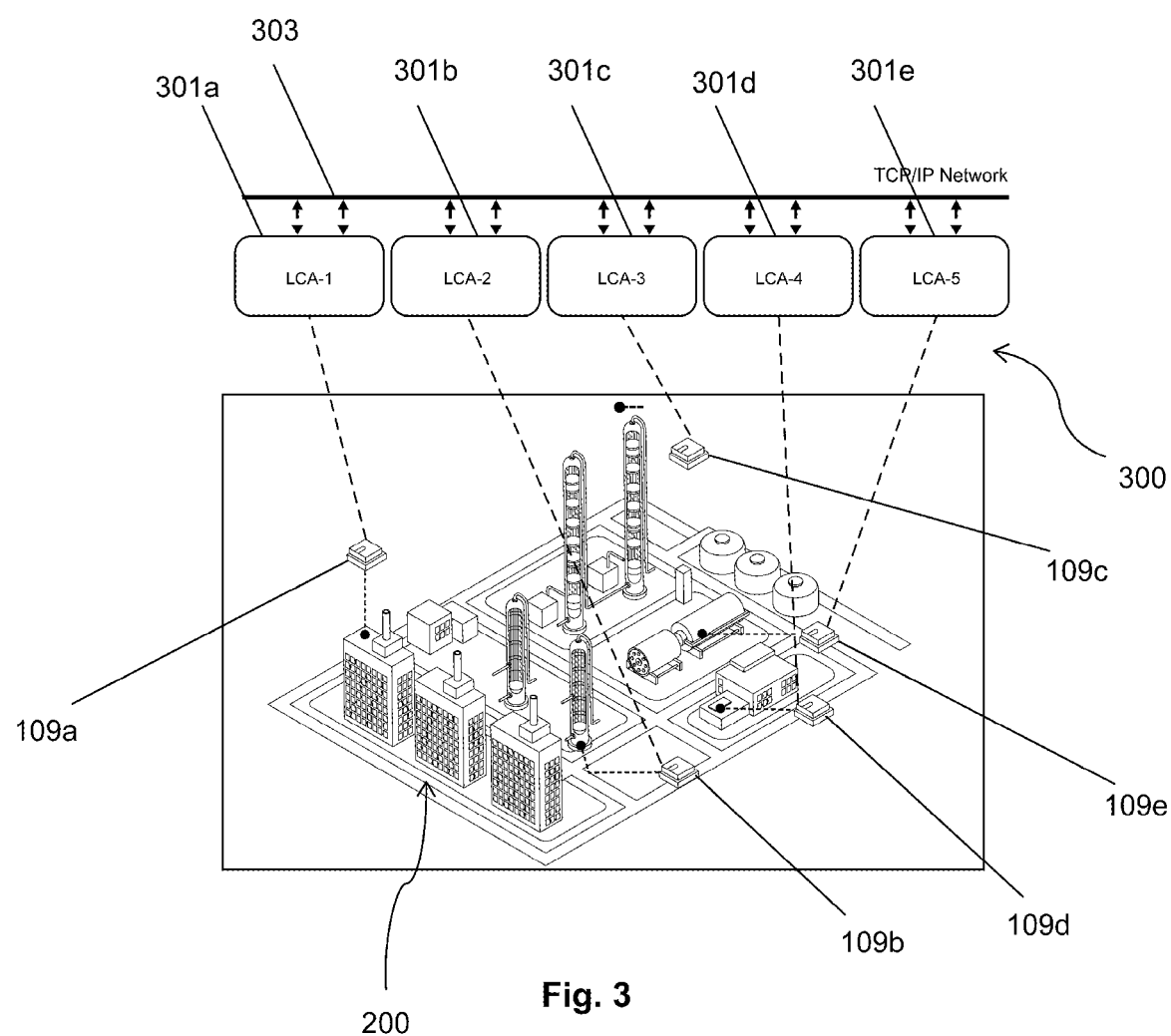
FIG. 3 is a view of an example process control system for an ethylene process according to aspects of the invention.

Referring to FIG. 3 there is shown an industrial plant 200 for performing a process. The particular example shown in FIG. 3 is an industrial plant 200 for an ethylene process. The performed process has a number of sub-processes having associated variables. The variables are measured or controlled using field instrumentation units 109a-109e which in this example are actuator/sensor units 109a-109e. The actuator/sensor units 109a-109e are dispersed throughout the industrial plant in appropriate positions for measuring/controlling the desired variables. In this example, each of the actuators/sensor units 109a-109e is for measuring/controlling one of the sub-processes of the process performed by the industrial plant 200.

Figure 6:
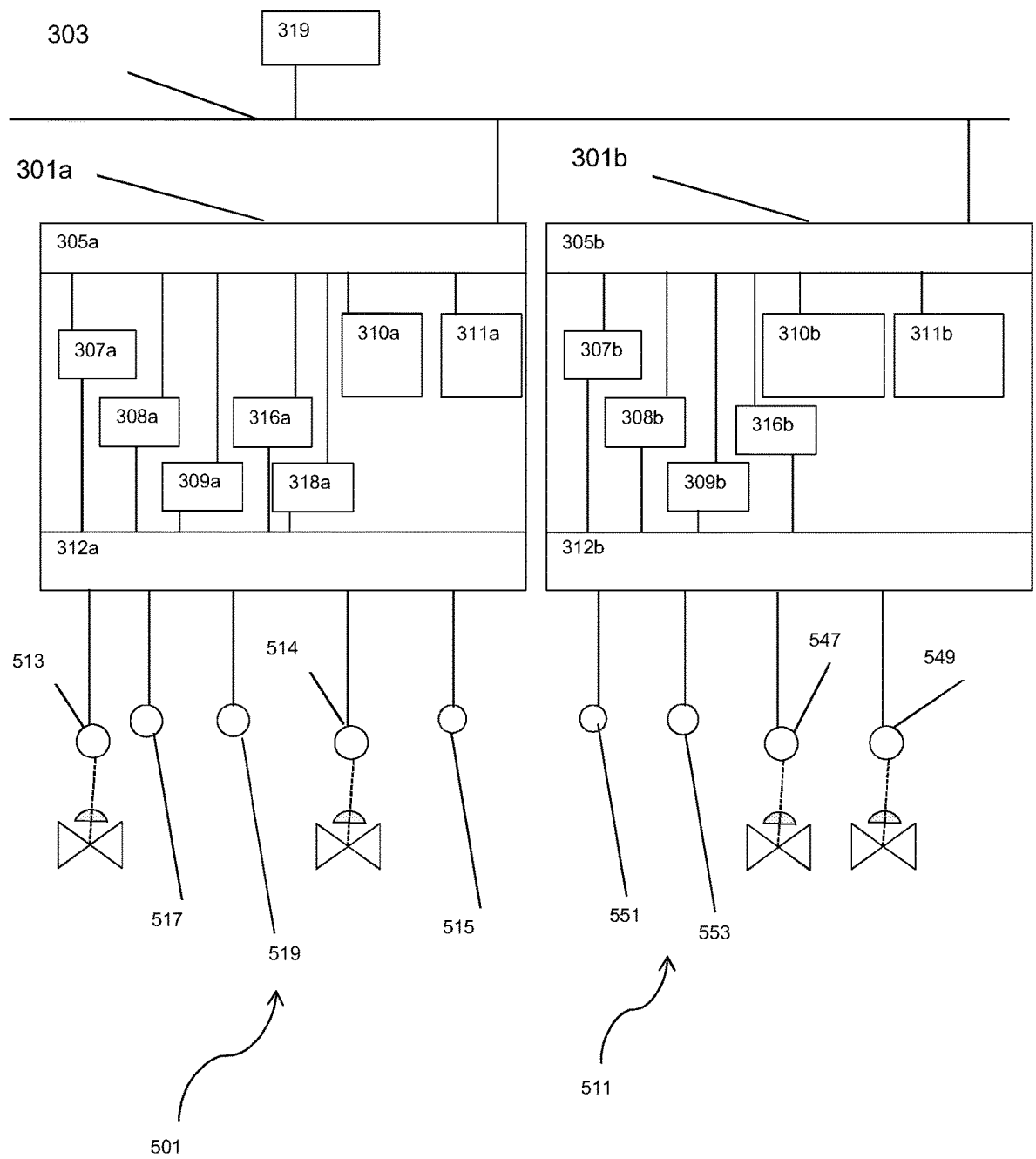
FIG. 6 is a schematic view of an example process control system for controlling an ethylene process according to FIG. 5.

The process is controlled using a process control system 300 according to aspects of the present invention. The process control system 300 comprises a plurality of control modules 301a-301e. The control modules 301a-301e are communicatively coupled to one another over a communication network 303. In the example of FIG. 3, the communication network 303 is shown as a TCP/IP network 303. In some example implementations, the process control system also comprises a message broker 319 (FIG. 6). The message broker facilitates communication between control modules 301a-301e.

Each of the control modules 301a-301e is associated with one of the plurality of sub-processes of the process performed by the industrial plant 200. This means that each of the control modules 301a-301e is able to communicate with the actuators/sensor units 109a-109e of the sub-process associated with the respective control module 301a-301e. The communication is shown as direct communication between each control module 301a-301e and the respective actuator/sensor unit 109a-109e, rather than indirect communication via another control module 301a-301e over the communication network 303. It will be appreciated that the direct communication may be in the form of wireless or wired communication.

At least one of and, in some example implementations, some or all of the plurality of control modules 301a-310e comprises a model, a communicator, and a controller. The model comprises a sub-process model defining a relationship between variables of the associated sub-process, and an inter-sub-process model defining a relationship between a variable of another sub-process and at least one of the variables of the associated sub-process. The sub-process model defines relationships that exist between the manipulated variables and/or disturbance variables of the control module with the controlled variables of the sub-process. The inter-sub-process model represents the interactions between sub-processes, and shows the relationships that exist between manipulated variables and/or controlled variables in other control modules with those in the subject control module 301a-301e.

The communicator is operable to communicate with a control module 301a-301e associated with the another sub-process so as to determine an updated value for the variable of the another sub-process.

The controller is operable to use the model and the updated value to determine a control signal for adjusting a manipulated variable of the associated sub-process. The control signal is used by the control module 301a-301e to control the relevant actuator/sensor unit 109a-109e to change the input to the associated sub-process based on the control signal.

In example implementations, the communicator is operable to transmit information regarding the control signal for adjusting the manipulated variable of the associated sub-process to the control module 301a-301e associated with the another sub-process. The control module 301a-301e associated with the another sub-process may have the same or similar structure to the control module of the associated sub-process. As described in more detailed below, the control module 301a-301e associated with the another sub-process may be operable to use the information and a model to determine a control signal for adjusting a manipulated variable of the another sub-process. That is, the control modules 301a-301e can exchange information and use this exchange of information and their respective models to determine their respective control signals.

Figure 1:
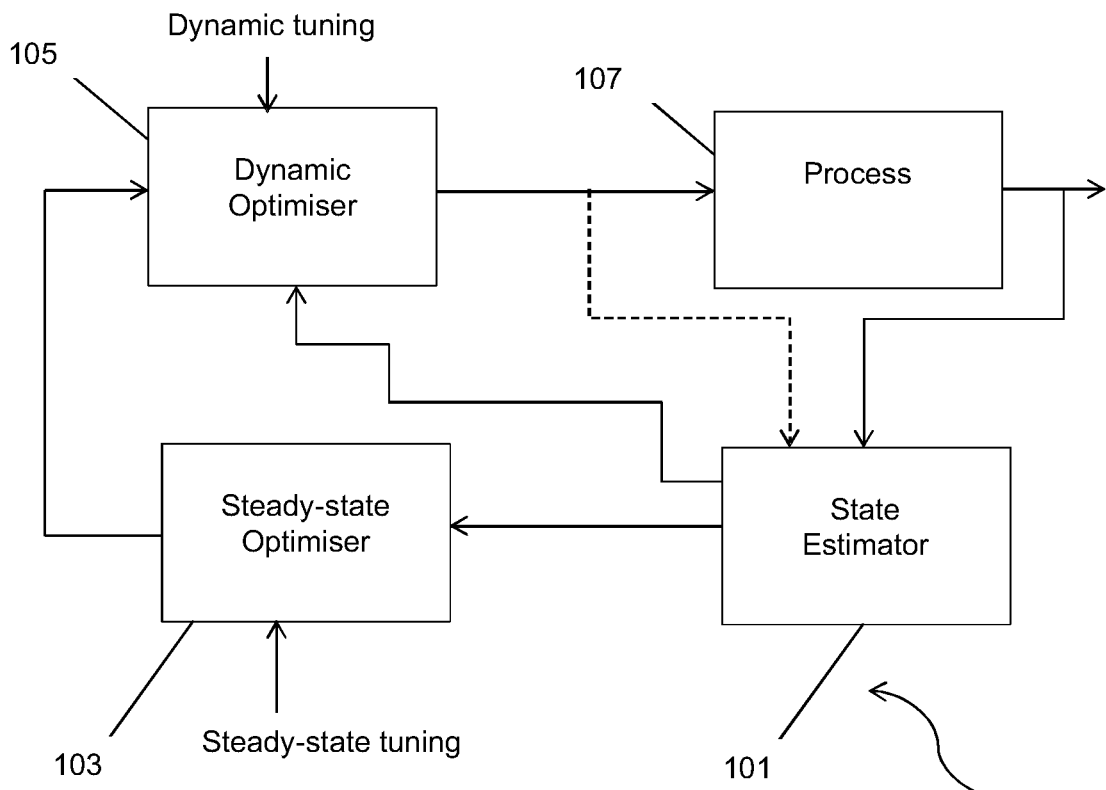
FIG. 1 shows a schematic view of a known model based predictive controller.
Figure 2:
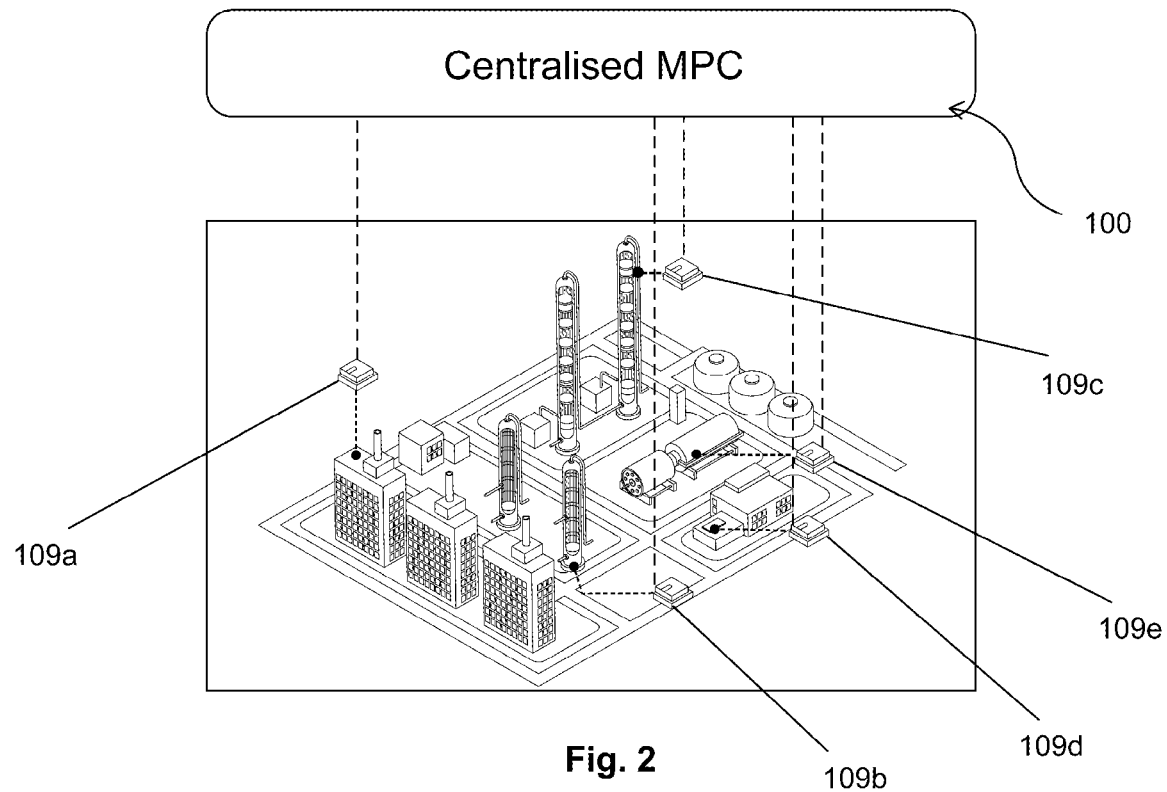
FIG. 2 is a view of a known centralised model based predictive controller for controlling a process.

In some example implementations the controller is a model based predictive controller having a similar structure to the model based predictive controller shown in FIG. 1. In these example implementations, the controller may comprise one or more of or all of a state estimator, steady-state optimiser, and dynamic optimiser. It will be appreciated that the state estimator, steady-state optimiser, and dynamic optimiser are not necessarily separate physical hardware units, and instead a single controller may perform the function of the state estimator, steady-state optimiser, and dynamic optimiser.

The state estimator is operable to determine state information indicating the current state of the associated sub-process. The state estimator may use new information that is available from sensors for controlled variables and/or measured disturbances to estimate the current state of the system. The new information may be an updated value for an input or output variable of the associated sub-process. The state estimator may be operable to use an updated value for an output variable, such as a controlled variable, of the associated sub-process, and/or an updated value for an input variable, such as a manipulated variable, of the associated sub-process to determine the state information. In some example implementations, the state estimation takes the form of a simple bias update method or a more complex state estimation using an optimal Kalman filter or similar established techniques.

The steady-state optimiser is operable to determine a desired future state of the associated sub-process. The steady-state optimiser may use the state information to determine the desired future state of the associated sub-process. In example implementations, the controller may be further operable to use information regarding coupled constraints between the associated sub-process and the another sub-process to determine the desired future state of the associated sub-process.

The dynamic optimiser is operable to use the model and the updated value to determine the control signal for adjusting a manipulated variable of the associated sub-process. The dynamic optimiser may be operable to use a sub-set of the model to determine the control signal for adjusting a manipulated variable of the associated sub-process. The sub-set of the model may include only controlled variables that have models linked to manipulated variables associated with the control module, other controlled variables, e.g. those that do not have a model or only have a non-cooperative model with the manipulated variables associated with the control module may not be included in the sub-set of the model. The sub-set of the model may be defined by disabling redundant controlled variables in the model.

Figure 4:
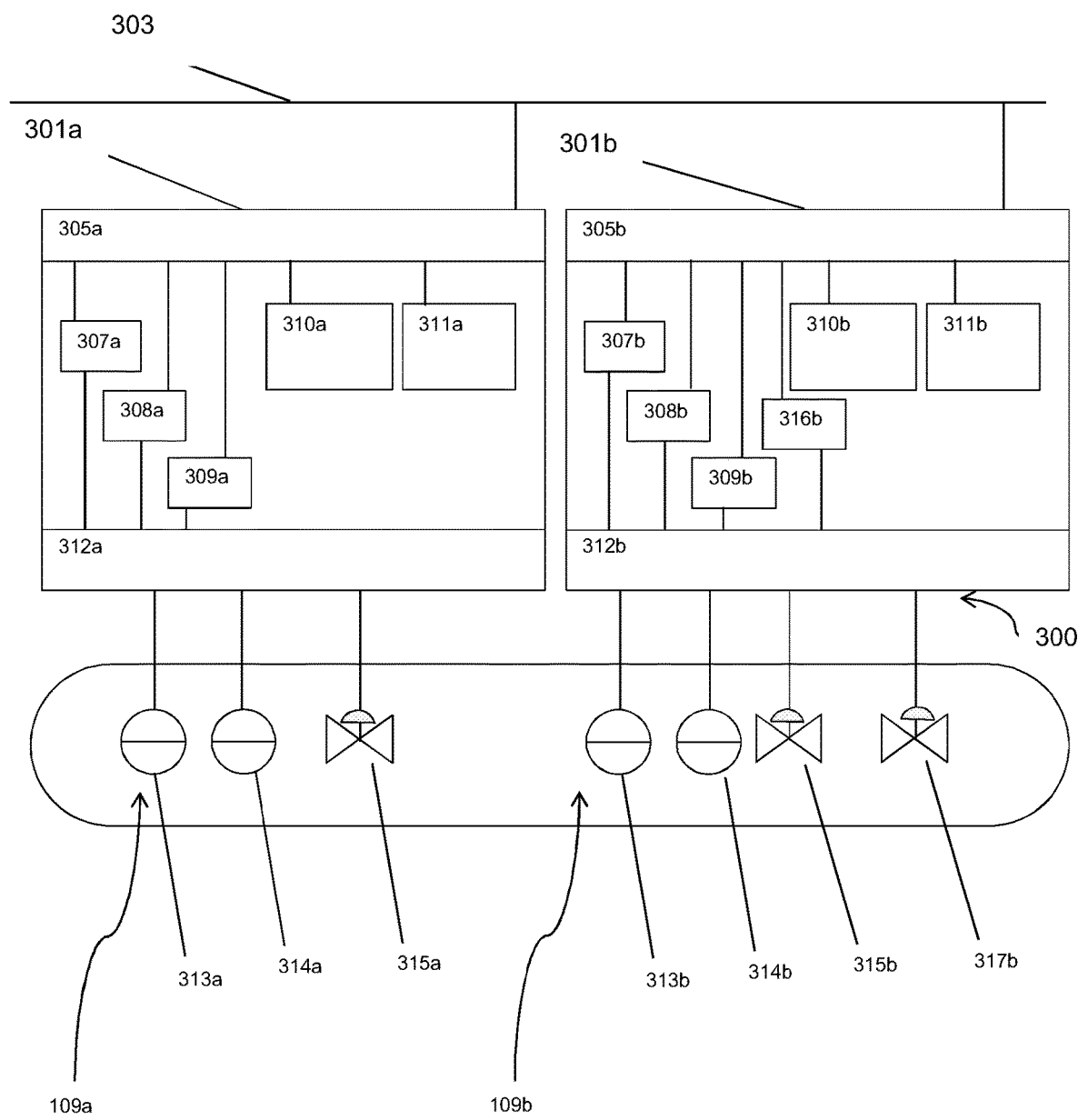
FIG. 4 is a schematic view of an example process control system according to aspects of the invention.

Significantly, rather than using a single, centralised control solution, multiple control modules 301a-301e are used in a distributed arrangement. Further, the multiple local control modules 301a-301e are not independent, and instead may communicate with one another and operate in a cooperative manner. This enables the control modules 301a-301e to achieve a shared objective function which approaches the global optimum even when significant interactions are present. In particular, by providing the inter-sub-process model and the communicator, the controllers of the control modules 301a-310e are able to take into account the updated value of the variable of the another sub-process, and use this information to determine how to adjust the manipulated variable of the associated sub-process. This enables the control modules 301a-301e to cooperate with the other control modules 301a-301e so as to provide the benefits of a distributed cooperative process control system Referring to FIG. 4, there is shown a detailed view of two of the control modules 301a and 301b in the process control system 300 of FIG. 3. The first control module 301a comprises a communicator 305a as described above which enables the control module 301a to communicate with other control modules 301b-301e over the communication network 303. In this example implementation, the communicator 305a is in the form of a communication interface 305a.

The first control module 301a comprises interface function blocks 307a, 308a, 309a for interfacing with the associated sub-process. Interface function block 307a is for a manipulated variable of the associated sub-process. The interface function block 307a is used for adjusting the manipulated variable of the associated sub-process. Interface function block 308a is for a controlled variable of the associated sub-process. Interface function block 308a is used for receiving measurement data related to the controlled variable from the associated sub-process. Interface function block 309a is for a disturbance variable of the associated sub-process. Interface function block 309a is used for receiving measurement data related to the disturbance variable from the associated sub-process. It will be appreciated that this arrangement of variables and interface function blocks is an example arrangement for illustrative purposes only.

The first control module 301a comprises a controller 310a as described above. The controller 310a is operable to receive data related to the controlled variable from the interface function block 308a, and the disturbance variable from the interface function block 309a. The controller 310a is further operable to determine a control signal for adjusting the manipulated signal via the interface function block 307a as describe above. The first control module 301a comprises a data store 311a. The data store 311a may store information required by the first control module 301a. In some example implementations, the first control module 301a does not require a data store 311a. Instead, or additionally, a storage unit 323 (FIG. 8) may be provided for the process control system and may be separate from the control modules 301a-301e. The storage unit 323 may be arranged to store information shared by the plurality of control modules. The plurality of control modules 301a-301e may be in communication with the storage unit 323 so that they may receive the required information.

The first control module 301a comprises a process interface 312a. The process interface 312a enables the control module 301a to connect with actuator/sensor unit 109a that is associated with the sub-process. The actuator/sensor unit 109a comprises devices 313a, 314a, 315a. Devices 313a and 314a are sensors for measuring data related to the controlled variable and the disturbance variable. The interface function blocks 308a and 309a are operable to receive the controlled and disturbance variable data from the devices 313a and 314a via the process interface 312. Device 315a is an actuator for adjusting the manipulated variable. Device 315a is operable to receive the control signal from the controller 310a via the interface function block 307a and process interface 312.

The second control module 301b is similar in structure to the first control module 301a. The second control module 301b comprises four interface function blocks 307b, 308b, 309b, and 316b. Interface function block 307b is for a first manipulated variable of the associated sub-process. The interface function block 307b is used for adjusting the first manipulated variable of the associated sub-process via first actuator 315b. Interface function block 308b is for a first controlled variable of the associated sub-process. Interface function block 308b is used for receiving measurement data related to the first controlled variable from the associated sub-process via the first sensor 313b. Interface function block 309b is for a second controlled variable of the associated sub-process. Interface function block 309b is used for receiving measurement data related to the second controlled variable from the associated sub-process via the second sensor 314b. Interface function block 316b is for a second manipulated variable of the associated sub-process. Interface function block 316b is used for adjusting the second manipulated variable of the associated sub-process via second actuator 317b.

In operation, the first and second control modules 301a, 301b cooperate towards a shared objective function. That is, both the first and the second control modules 301a, 301b comprise a model. Their respective models comprise a sub-process model defining a relationship between variables of the associated sub-process, and an inter-sub-process model defining a relationship between a variable of another sub-process and at least one of the variables of the associated sub-process. The inter-sub-process model thus details how variables of other sub-processes affect the sub-process of the respective control module 301a, 301b. This means that if a variable of the sub-process related to control module 301a affects the sub-process related to control module 301b, the inter-sub-process model of control module 301b will reflect this relationship. The control modules 301a, 301b exchange information regarding the relevant variables (e.g. the control signals which may be manipulated variable move trajectories) over the communication network 303. Thus, the control modules 301a, 301b can account for changes in related sub-processes when solving their optimisation problems. The model may be part of controller 310a, 310b, stored in data store 311a, 311b or temporarily stored and received over communication network 303.

By way of example, an implementation of the process control system for the production of ethylene according to the present invention will now be described. Ethylene is commonly produced by steam cracking a petrochemical feedstock such as ethane.

Figure 5:
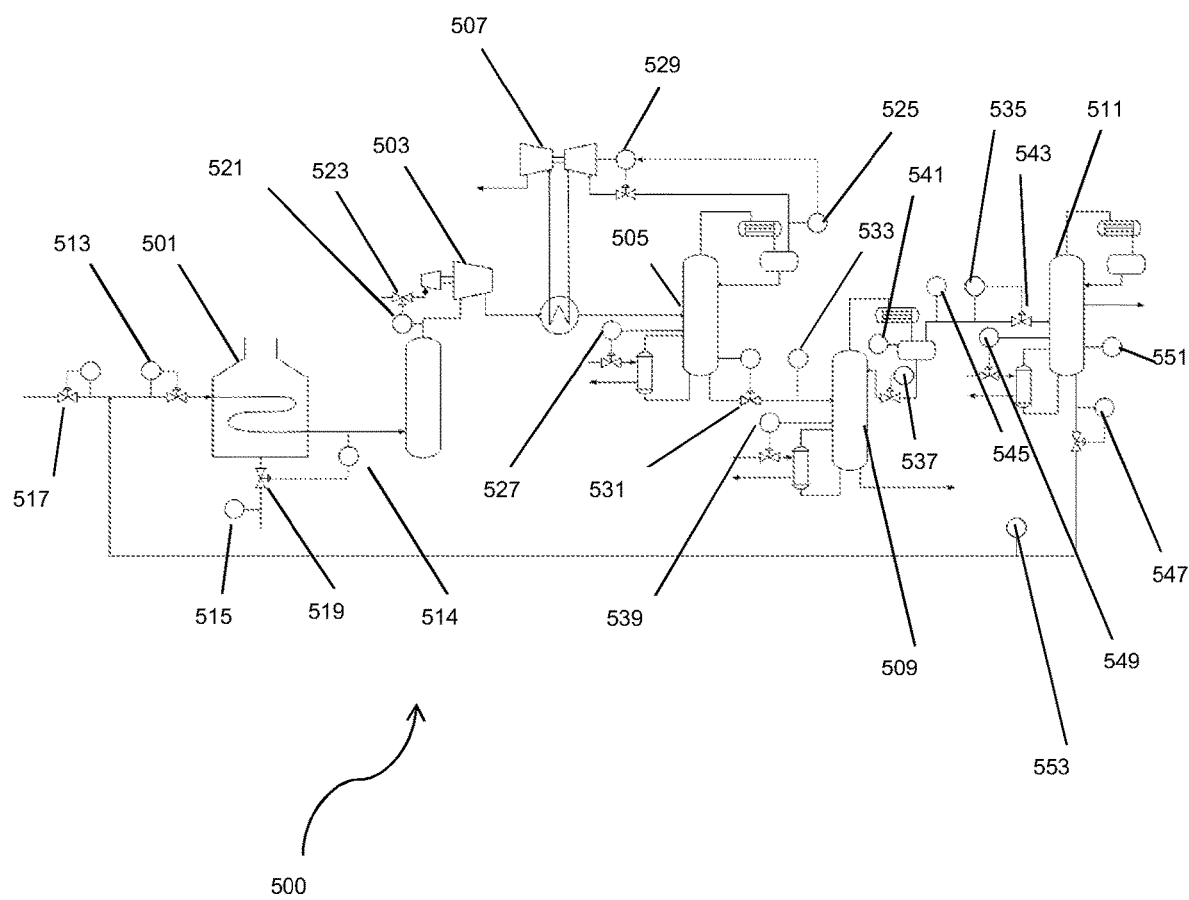
FIG. 5 is a schematic view of an example ethylene process according to aspects of the invention.

Referring to Figure-5 there is shown a simplified ethylene process schematic 500 comprising a single steam cracking furnace 501, compressor 503, demethaniser column 505, expander 507, deethaniser column 509 and C2-splitter column 511. Each section of the ethylene process (steam cracking furnace, distillation columns, compressor etc.) can be considered a separate unit operation, a sub-process. The sub-processes have manipulated, controlled and disturbance variables.

The steam cracking furnace 501 sub-process has furnace feed 513 and furnace COT 514 manipulated variables, and a fuel gas heating value 515 disturbance variable. The feed header valve 517 and fuel gas valve 519 are controlled variables for the steam cracking furnace 501 sub-process. The compressor 503 sub-process has a compressor suction pressure 521 manipulated variable, and a turbine governor valve 523 controlled variable. The demethaniser column 505 sub-process has demethaniser pressure 525 and demethaniser bottom temperature 527 manipulated variables. The expander speed 529, demethaniser level valve 531, and demethaniser bottom composition 533 are controlled variables for the demethaniser column 505 sub-process.

The deethaniser column 509 sub-process has deethaniser distillate flow 535, deethaniser reflux flow 537, and deethaniser bottom temperature 539 manipulated variables. The deethaniser reflux drum level 541, deethaniser distillate valve 543, and deethaniser top composition 545 are controlled variables for the deethaniser column 509 sub-process. The C2-splitter column 511 sub-process has C2 splitter bottom flow 547, and C2 splitter bottom temperature 549 manipulated variables. The C2 splitter bottom level 551, and C2 splitter bottom composition 553 are controlled variables for the C2-splitter column 511 sub-process.

It is common to control each sub-process as described above with a separate model predictive controller. However, due to strong interactions between the individual sub-process sections these individual controllers will not result in stable or optimal control of the complete ethylene process 500. An alternative approach is to design a single large model predictive controller for the complete ethylene process which will be expected to provide optimal control but will be very complex to develop and maintain.

Unlike the existing approaches, the ethylene plant of FIG. 5 is controlled through a process control system according to aspects of the present invention comprising five control modules. The ethylene process has five sub-processes, and each sub-process is controlled using one of the five local control modules. Each local control module includes a model that comprises all the relevant manipulated and controlled variables for all overlapping sub-processes and coupled constraints. The models are derived by the central configurator from the centralised model during a control initialisation process as described below.

Significantly, the process control system of the present invention provides distributed cooperative control. This means that a separate control module may be configured to control each sub-process section. The control modules of the present invention are designed to operate collaboratively such that in addition to control of the local sub-process section, they are also aware of global constraints and interactions between process sections. By operating collaboratively, control modules can approach a global optimum and ensure stability of each individual sub-process section.

Referring to FIG. 6, two of the control modules 301a, 301b are shown. These particular control modules 301a, 301b are the furnace control module 301a and the C2-Splitter control module 301b. The two control modules 301a, 301b are similar in structure to the control modules 301a, 301b shown in FIG. 3 and like reference numerals have been used in FIG. 6 to describe like components.

In this example implementation, a centralised model is used to define the interactions between variables in the process. The centralised model is generated by a central configurator 321 (FIG. 7) of the process control system 300. The centralised model is used by the central configurator 321 to derive the models for the individual control modules of the process control system 300. It will, however, be appreciated that the process control system 300 is not required to comprise a central configurator 321, and in some examples no central configurator 321 is employed. In these examples, the models may be assembled on each control module 310a, 310b by retrieving model relationship information from the communication network 303.

In this example implementation, models associated with controlled variables of the process are provided by a user as a collection of single input—single output or multi input—multi output models. The central configurator 321 then operates to assemble the centralised model using the provided models. In beneficial implementations, the central configurator 321 is further operable to update the centralised model in response to a variable or a control module being added to or removed from the process control system 300. In this example implementation, if a new control module preconfigured with variables and associated sub-process and inter-sub-process models is added to the process control system 300, the central configurator 321 may be operable to assemble the newly added models into the centralised model.

While not required, the central configurator 321 may also have the ability to learn aspects of the centralised model using a model identification algorithm. The model identification algorithm in this example comprises receiving input data from a controller of a control module 301a, 301b and applying a model identification function to the input data to generate the aspects of the centralised model.

Referring to Table 1 below, there is shown a centralised model that is formed by combining the sub-process models for each sub-process of the ethylene process along with the inter-sub-process models that represent interactions between different sub-processes. In this model, the rows represent inputs to the process. These will be the manipulated variables and disturbance variables of the associated control modules. The columns in the model represent process outputs. These will be the controlled variables of the associated control modules 301a-301e.

TABLE 1

| | Controlled Variables | | | | | |
|---|---|---|---|---|---|---|
| | Feed Header Valve 517 | Fuel Gas Valve 519 | Turbine Governor Valve 523 | Expander Speed 529 | Demethaniser Level Valve 531 | Demethaniser Bottom Composition 533 |
| Manipulated Variables | | | | | | |
| Furnace Feed 513 | X | X | X | X' | X' | |
| Furnace COT 514 | | X | | | | |
| Compressor Suction Pressure 521 | | | X | | | |
| Demethaniser Pressure 525 | | | | X | X | |
| Demethaniser Bottom Temperature 527 | | | | | X | X |
| Deethaniser Distillate Flow 535 | | | | | | |
| Deethaniser Reflux Flow 537 | | | | | | |
| Deethaniser Bottom Temperature 539 | | | | | | |

TABLE 1-continued

| | | |
|---|---|---|
| C2 Splitter Bottom Flow 547 | X | |
| C2 Splitter Bottom Temperature 549 | | |
| Disturbance Variables | | |
| Fuel Gas Heating Value 515 | | X |

| | Controlled Variables | | | | |
|---|---|---|---|---|---|
| | Deethaniser Reflux Drum Level 541 | Deethaniser Distillate Valve 543 | Deethaniser Top Composition 545 | C2 Splitter Bottom Level 551 | C2 Splitter Bottom Composition 553 |
| Manipulated Variables | | | | | |
| Furnace Feed 513 | X | | | | |
| Furnace COT 514 | | | | | |
| Compressor Suction Pressure 521 | | | | | |
| Demethaniser Pressure 525 | | | | | |
| Demethaniser Bottom Temperature 527 | | | | | |
| Deethaniser Distillate Flow 535 | X | X | | X | |
| Deethaniser Reflux Flow 537 | X | | X | | |
| Deethaniser Bottom Temperature 539 | | | X | | |
| C2 Splitter Bottom Flow 547 | | | | X | |
| C2 Splitter Bottom Temperature 549 | | | | | X |
| Disturbance Variables | | | | | |
| Fuel Gas Heating Value 515 | | | | | |

In the above table X indicates the presence of a model response curve between the manipulated or disturbance variable and the respective controlled variable. X' indicates the presence of a non-cooperative model response curve. A non-cooperative model defines a relationship between a manipulated variable and a controlled variable that will not be used to control the controlled variable.

The above example centralised model includes a steam cracking furnace 501 sub-process model with furnace feed 513 and furnace COT 514 as manipulated variables, feed header valve 517 and fuel gas valve 519 as controlled variables, and fuel gas heating value 515 as a disturbance variable. The steam cracking furnace 501 sub-process model shows the relationship between these manipulated and disturbance variables 513, 514, 515, and the controlled variables 517 and 519.

Additionally, the centralised model shows that there is an inter-sub-process model defining a relationship between the C2 splitter bottom flow 547 manipulated variable and the feed header valve 517 controlled variable. There are also inter-sub-process models defining relationships between the furnace feed 513 manipulated variable and the turbine governor valve 523 and deethaniser reflux drum level 541 controlled variables. The centralised model also includes inter-sub-process models from the furnace feed 513 manipulated variable onto expander speed 529 and demethaniser level valve 531 controlled variables. These inter-sub-process models are designated as non-cooperative models. This means that models have been identified between these variables 513, 529, 531 but these models will not be used for control. In other words, the furnace feed 513 manipulated variable should not be considered as a degree of freedom for controlling expander speed 529 or demethaniser level valve 531 controlled variables.

In the above example, each sub-process model defines relationships between any manipulated variables of the associated sub-process and any controlled variables of the associated sub-process. In addition, the sub-process models each define relationships between any disturbance variables of the associated sub-process and any controlled variables of the associated sub-process. Further, each inter-sub-process model defines relationships between any manipulated variables or controlled variables of the other sub-processes and any variables of the associated sub-process. This means that the variables of the other sub-processes that affect or are affected by the variables of the associated sub-process are included in the inter-sub-process model.

The inter-sub-process model may define the relationship between variables of the another sub-process that affect or are affected by at least one of the variables of the associated sub-process. The communicator may be operable to communicate with the control module associated with the another sub-process so as to determine updated values for the variables of the another sub-process included in the inter-sub-process model. The controller may be operable to use the model and the updated values to determine the control signal for adjusting the manipulated variable of the associated sub-process.

The central configurator 321 of this example implementation operates asynchronously. The central configurator 321 may operate when a control module or variable for the process is added or removed from the process control system. The central configurator 321 may operate when an initialisation request is triggered by a control module 301a-301e or on the central configurator 321 itself. The central configurator 321 may not operate at other times.

In response to the central configurator 321 being triggered to operate, the central configurator 321 may perform at least one of the following tasks:
generate the centralised model;
perform a consistency check on the centralised model;
determine an optimum segregation of the centralised model based on model interactions
form a new model for one or more of the control modules 301a-301e;
transmit the new model to the relevant control module 301a-301e.

Figure 7:
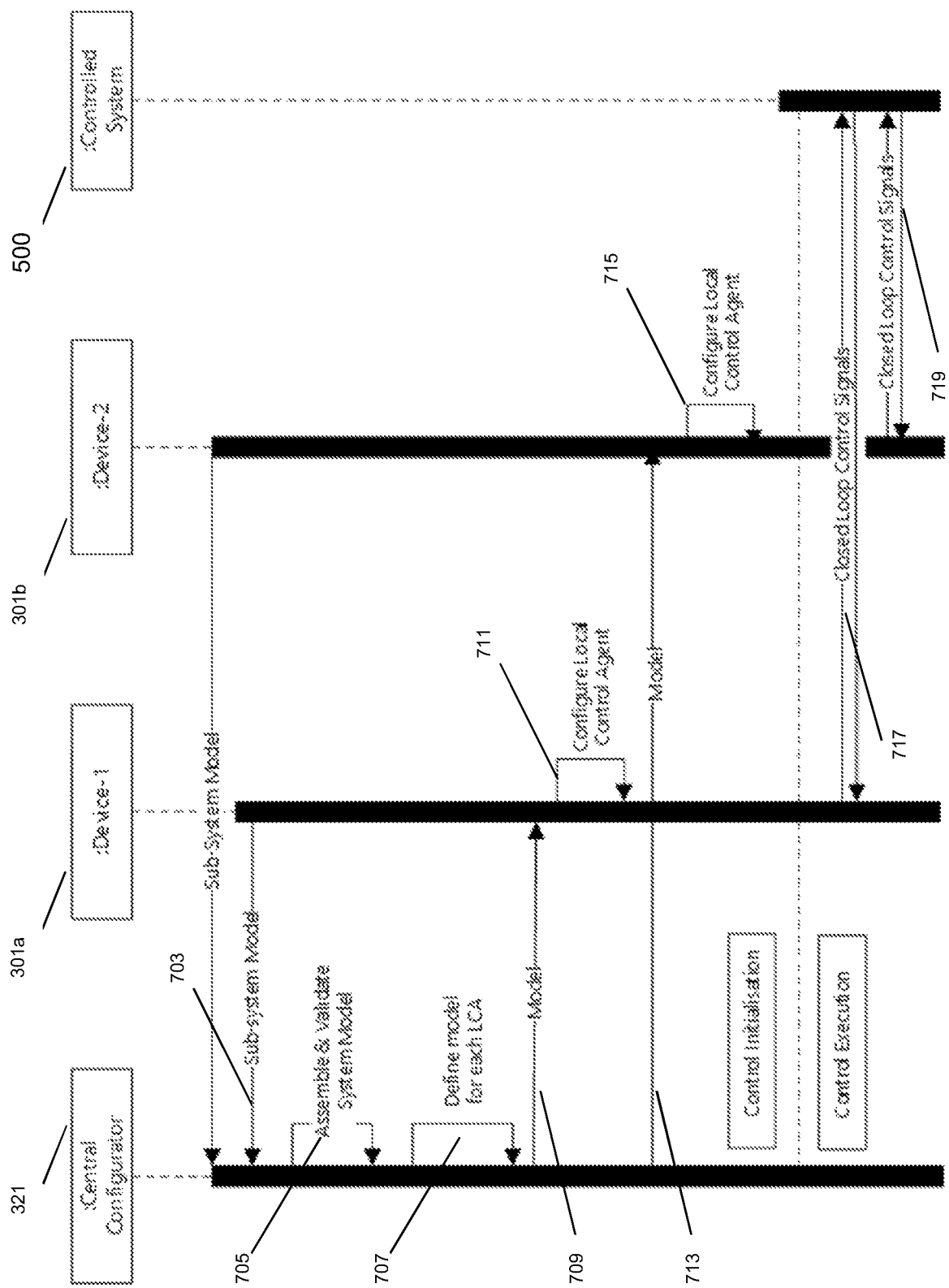
FIG. 7 is a message flow diagram for an example process control system during a control initialisation stage according to aspects of the invention.

In more detail, an example operation process control system during a control initialisation stage is shown in FIG. 7. The control initialisation may be initiated when a component is added to or removed from the communication network 303 or when an initialisation requested is triggered.

In stages 701 and 703, the control modules 301a and 301b provide their models to the central configurator 321.

In stage 705, the central configurator 321 generates the centralised model and performs consistency checks on the centralised model. The consistency checks are performed so as to help ensure that the centralised model matches controllability requirements. If required, adjustments may be made to the model response curves, within defined tolerance limits, to improve controllability or model condition. These adjustments may be carried out by the central configuration without the requirement of user intervention.

In stage 707, the central configurator 321 defines the models for the control modules 301a, 301b using the centralised model. The defining of the models will look to determine the optimum sub-process model segregation based on model interactions. Stage 707 will consider the hardware distribution, e.g. which manipulated variables are assigned to which control modules 301a, 301b, as well as the optimal sub-process assignment to enhance optimiser convergence.

In stage 709, the central configurator 321 communicates the model for control module 301a to control module 301a over the communication network. This communication may take place via a message broker. In stage 711, the control module 301a uses the model to generate a model predictive control function, and in particular generate a state estimator and steady state optimiser.

In stage 711, the central configurator 321 communicates the model for control module 301b to control module 301b over the communication network. This communication may take place via a message broker. In stage 715, the control module 301b uses the model to generate a model predictive control function, and in particular generate a state estimator and steady state optimiser.

Once the control initialisation is completed, the control execution for controlling the process 500 is performed using the control modules 301a, 301b as shown in stages 717 and 719. The central configurator 321 does not operate during the control execution stage.

In particular, in this example the model is derived from the centralised model using the following approach:
1. For each manipulated variable in the control module (row in the centralised model matrix of Table 1), identify all controlled variables (columns in the centralised model matrix of Table 1) that have a corresponding cooperative control response curve ('X' in Table 1) and add these to the control module's controlled variable list.
2. If no new controlled variables were added then go to step 5.
3. For each new controlled variable in the control module's list identify any manipulated variables having a corresponding response curve ('X' in Table 1) that are not already included, and add these to the control module's list.
4. If no new manipulated variables were added then go to step 5, else go to step 1.
5. For each controlled variable in the control module's list, identify any measured disturbance variables that have a corresponding response curve ('X' in Table 1) and add these to the control module's list.

Referring to the ethylene process example, the above procedure may be applied to the formation of the model for the control modules 301a-301e associated with the individual sub-processes. By way of example, the generation of the model for the control module 301a for the steam cracking furnace 501 sub-process will now be described.

The steam cracking furnace 501 sub-process has two manipulated variables 513, 514 and one disturbance variable 515. Following step 1 of the process, the controlled variables 517, 519, 523, and 541 are identified as they all have cooperative response models with the manipulated and disturbance variables 513, 514. The controlled variables 529 and 531 are not included as they have non-cooperative models with the manipulated variables 513, 514. Step 1 thus introduces new controlled variables 523 and 541 along with existing variables 517 and 519 and so following step 3, the associated manipulated variables 521, 535, 537 and 547 need to be included. As new manipulated variables are added, step 1 is repeated which involves introducing controlled variables 543, 545, and 551. Repeating step 3 adds manipulated variable 539 to the set of manipulated variables. The addition of manipulated variable 539 does not require the addition of any additional controlled variables, as such the process continues to step 5 and adds the disturbance variable 515. The model is now complete as shown in the below Table 2.

TABLE 2

| Model | 517 | 519 | 523 | 541 | 543 | 545 | 551 | |
|---|---|---|---|---|---|---|---|---|
| 513 | X | X | X | X | | | | Manipulated Variable |
| 514 | | X | | | | | | Manipulated Variable |
| 521 | | | X | | | | | Manipulated Variable |
| 535 | | | | X | X | | X | Manipulated Variable |
| 537 | | | | X | | X | | Manipulated Variable |
| 539 | | | | | | X | | Manipulated Variable |
| 547 | X | | | | | | X | Manipulated Variable |
| 515 | | X | | | | | | Disturbance Variable |

In this example implementation, the controllers of the control modules 301a-301e are model based predictive controllers and each comprise a state estimator, steady-state optimiser, and dynamic optimiser. The models for the control modules 301a-301e are shared by the state estimator and the steady state optimiser components of the controllers of the control modules 301a-301e.

Each control module 301a-301e also includes a dynamic model this is derived from and is a sub-set of the model. The dynamic optimiser is operable to use the sub-set of the model to determine the control signal for adjusting a manipulated variable of the associated sub-process. The sub-set of the model includes only controlled variables that have models linked to manipulated variables associated with the control module, other controlled variables, e.g. those that do not have a model or only have a non-cooperative model with the manipulated variables associated with the control module are not included in the sub-set of the model.

The sub-set of the model which is referred to as the dynamic model is defined by disabling redundant controlled variables in the model. In this example, the formation of the dynamic model is performed using the following approach:

1. For each manipulated variable in the control module (row in the centralised model matrix of Table 1), identify all controlled variables (columns in the centralised model matrix of Table 1) that have a corresponding cooperative control model response curve ('X' in Table 1) and add these to the control module's controlled variable list.
2. For each new controlled variable in the control module's list identify any manipulated variables having a corresponding response curve, that are not already included, and add these to the control module's disturbance variable list.
3. For each controlled variable in the control module's list identify any disturbance variables that have a corresponding response curve and add these to the control module's disturbance variable list.

Referring to the ethylene process example, the above procedure may be applied to the formation of the dynamic model for the control modules 301a-301e associated with the individual sub-processes. By way of example, the generation of the dynamic model for the control module 301a for the steam cracking furnace 501 sub-process will now be described.

The steam cracking furnace 501 sub-process has two manipulated variables 513, 514 and one disturbance variable 515. The two manipulated variables 513, 514 have cooperative control models with four controlled variables 517, 519, 523, and 541 and so these are the controlled variables for the dynamic optimiser. These controlled variables 517, 519, 523 and 541 have sub-process models with the manipulated variables 521, 535, 537, and 547 and so these are included as disturbance variables in the dynamic optimiser. The resulting dynamic model has controlled variables 517, 519, 523, 541 and manipulated variables 513, 514, and disturbance variables 521, 535, 537, 547, and 515. The example dynamic model is shown in the below Table 3.

TABLE 3

| Dynamic Model | 517 | 519 | 523 | 541 | |
|---|---|---|---|---|---|
| 513 | X | X | X | X | Manipulated Variable |
| 514 | | X | | | Manipulated Variable |
| 521 | | | X | | Disturbance Variable |
| 535 | | | | X | Disturbance Variable |
| 537 | | | | X | Disturbance Variable |
| 547 | X | | | | Disturbance Variable |
| 515 | | X | | | Disturbance Variable |

Similar processes may be used to generate the model and dynamic model for the remaining sub-processes of the ethylene process.

The model and dynamic model for the compressor 503 sub-process are shown in the below Tables 4 and 5.

TABLE 4

| Model | 517 | 519 | 523 | 541 | 543 | 545 | 551 | |
|---|---|---|---|---|---|---|---|---|
| 513 | X | X | X | X | | | | Manipulated Variable |
| 514 | | X | | | | | | Manipulated Variable |
| 521 | | | X | | | | | Manipulated Variable |
| 535 | | | | X | X | | X | Manipulated Variable |
| 537 | | | | X | | X | | Manipulated Variable |
| 539 | | | | | | X | | Manipulated Variable |
| 547 | X | | | | | | X | Manipulated Variable |

TABLE 5

| Dynamic Model | 523 | | |
|---|---|---|---|
| 513 | X | | Disturbance Variable |
| 521 | X | | Manipulated Variable |

The model and dynamic model for the demethaniser column 505 sub-process are shown in the below Tables 6 and 7.

TABLE 6

| Model | 529 | 531 | 533 | |
|---|---|---|---|---|
| 513 | X' | X' | | Disturbance Variable |
| 525 | X | X | | Manipulated Variable |
| 527 | X | | X | Manipulated Variable |

TABLE 7

| Dynamic Model | 529 | 531 | 533 | |
|---|---|---|---|---|
| 513 | X' | X' | | Disturbance Variable |
| 525 | X | X | | Manipulated Variable |
| 527 | X | | X | Disturbance Variable |

In forming the model and dynamic model of the demethaniser it is noted that although furnace feed 513 manipulated variable has models to the expander speed 529 and demethaniser level valve 531 which are both controlled variables in the demethaniser controller, the furnace feed 513 is included as a disturbance variable rather than a manipulated variable. This allows the demethaniser controller, that is the controller of the control module 301a-301e for the demethaniser sub-process, to take account of the move plan developed by the control module for the furnace sub-process.

The model and dynamic model for the deethaniser column 509 sub-process are shown in the below Tables 8 and 9.

TABLE 8

| Model | 517 | 519 | 523 | 541 | 543 | 545 | 551 | |
|---|---|---|---|---|---|---|---|---|
| 513 | X | X | X | X | | | | Manipulated Variable |
| 514 | | X | | | | | | Manipulated Variable |
| 521 | | | X | | | | | Manipulated Variable |
| 535 | | | | X | X | | X | Manipulated Variable |
| 537 | | | | X | | X | | Manipulated Variable |
| 539 | | | | | | X | | Manipulated Variable |
| 547 | X | | | | | | X | Manipulated Variable |

TABLE 9

| Dynamic Model | 541 | 543 | 545 | 551 | |
|---|---|---|---|---|---|
| 513 | X | | | | Disturbance Variable |
| 535 | X | X | | X | Manipulated Variable |
| 537 | X | | X | | Manipulated Variable |
| 539 | | | X | | Manipulated Variable |
| 547 | | | | X | Disturbance Variable |

The model and dynamic model for the C2-splitter column 511 sub-process are shown in the below Tables 10 and 11.

TABLE 10

| Model | 517 | 519 | 523 | 541 | 543 | 545 | 551 | 553 | |
|---|---|---|---|---|---|---|---|---|---|
| 513 | X | X | X | X | | | | | Manipulated Variable |
| 514 | | X | | | | | | | Manipulated Variable |
| 521 | | | X | | | | | | Manipulated Variable |
| 535 | | | | X | X | | X | | Manipulated Variable |
| 537 | | | | X | | X | | | Manipulated Variable |
| 539 | | | | | | X | | | Manipulated Variable |
| 547 | X | | | | | | X | | Manipulated Variable |
| 549 | | | | | | | | X | Manipulated Variable |

TABLE 11

| Dynamic Model | 517 | 551 | 553 | |
|---|---|---|---|---|
| 513 | X | | | Disturbance Variable |
| 535 | | X | | Disturbance Variable |
| 547 | X | X | | Manipulated Variable |
| 549 | | | X | Manipulated Variable |

Figure 8:
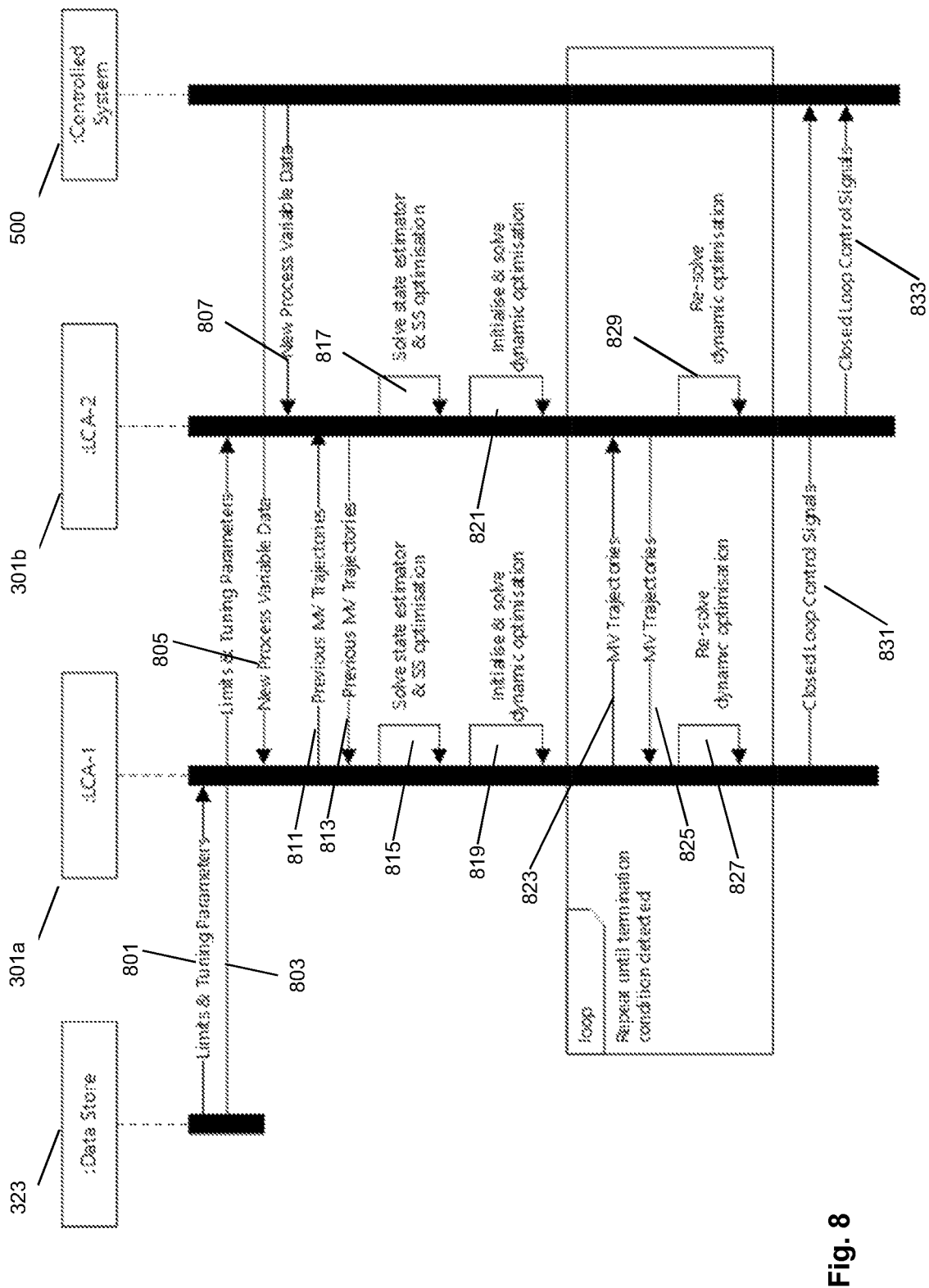
FIG. 8 is a message flow diagram for an example process control system during a control cycle according to aspects of the invention.

Referring to FIG. 8, there is shown an example control cycle for a control execution for the process control system 300. The control execution is a continuous, cyclic, or event driven process. The control execution involves the control modules 301a, 301b, process variables, message broker (FIG. 6), and data store 323. The central configurator does not participate in this example control execution.

During the first stages of the control cycle, the control modules 301a, 301b retrieve all new relevant manipulated variable, controlled variable, and disturbance variable data from the associated process variables, along with constraints and tuning parameters from the data store 323, and manipulated variable move trajectories from the other control modules 301a, 301b. The control modules 301a, 301b are connected to one another via communication network 303 and are responsible for retrieving process data from the field instrumentation that are assigned to them and for publishing that data to the communication network 303 via the message broker 319.

In particular, in stages 801 and 803, the control modules 301a, 301b receive limit constraints on the controlled and manipulated variables and variable and tuning parameters from the data store 323 via the communication network. This may be performed via the message broker 319 (FIG. 6).

Further, in stage 805, the control module 301a receives new variable data for the variables of the sub-process associated with the control module 301a from the process 500. For the example of FIG. 6, this means that the control module 301a for the furnace sub-process 501 retrieves current process data for the furnace feed 513, the furnace COT 514, the fuel gas heating value 515, the feed header valve position 517, and fuel gas valve position 519. All this data is then published to the message broker 319 using unique tag identifiers, making it available to other devices.

Further, in stage 807, the control module 301b receives new variable data for the variables of the sub-process associated with the control module 301b from the process 500.

In stage 811, the control module 301a transmits information regarding the control signal for adjusting one or more manipulated variables of the associated sub-process to the control module 301b. The control signal in this example is in the form of one or more manipulated variable trajectories. In stage 813, the control module 301b transmits information regarding the control signal for adjusting one or more manipulated variables of the associated sub-process to the control module 310a. The control signal in this example is in the form of one or more manipulated variable trajectories. This data is transmitted to the message broker 319.

As a result of the above stages, the control module 301a acquires controlled variable data for turbine governor valve 523, deethaniser reflux drum level 541, deethaniser distillate valve 543, deethaniser top composition 545, and C2 splitter bottom level 551, and manipulated variable data for the compressor suction pressure 521, deethaniser distillate flow 535, deethaniser reflux flow 537, deethaniser bottom temperature, and C2 Splitter bottom flow 547. This data is retrieved from the message broker 319 and is provided to the message broker 319 by the other control modules 301b-301e. The control module 301b for the C2 splitter column 511 sub-process acquires non-local controlled variable data for 517, 519, 523, 541, 543, and 545, and manipulated variable data for 513, 514, 521,535, 537, 539 from the message broker 319.

As a result of the above stages, the control modules 301a, 301b have sufficient data to solve locally their state estimation and steady state optimization problems. In the example implementation of FIGS. 5 and 6, the state estimation and steady state optimisation problems are consistent between the two control modules 301a, 301b and each has an equivalent data set. This means that the two local solutions are consistent. This may be required for resolving shared resource constraints.

For example, the feed header valve 517, is a shared constraint between the control modules 301a and 301b and has models from both the furnace feed 513 and the C2 splitter bottom flow 547. The computed local solutions will result in consistent steady state target values for furnace feed 513 and C2 splitter bottom flow 547, taking account of the shared constraint, this avoids conflict between the two control modules 301a, 301b and helps ensure that optimal control is provided. As a further example, the C2 splitter bottom level 551 is influenced directly by the C2 splitter bottom flow 547 and deethaniser distillate flow 535 and indirectly by the furnace feed 513. Increasing the C2-splitter bottom flow 547 will take material out of the vessel and decrease the level while increasing the vessel feed (directly by increasing deethaniser distillate flow 535 or indirectly by increasing furnace feed 513) will cause the C2 splitter bottom level 551 to increase. The steady state targets computed by each local control module 301a, 301b are desired to be consistent to avoid the level itself being imbalanced.

In more detail, in stage 815 of the control cycle, the controller of the control module 301a uses the received data to solve a state estimation problem so as to determine state information indicating the current state of the associated sub-process. In addition, the controller of the control module 301a uses the received data to solve a steady-state estimation problem to determine a desired future state of the associated sub-process.

Further, in stage 817, the controller of the control module 301b uses the received data to solve a state estimation problem so as to determine state information indicating the current state of the associated sub-process. In addition, the controller of the control module 301b uses the received data to solve a steady-state estimation problem to determine a desired future state of the associated sub-process.

The state estimation and steady-state optimisation problems for the process control system are thus solved separately in each controller. This avoids the requirement for centralised estimation and steady state target optimisation and allows each controller to operate autonomously.

The computed steady state target values are passed locally to the dynamic optimisers of the controllers of the control modules 301a, 301b where they will be used in computing the optimal move trajectories for the local manipulated variables.

In particular, in stage 819, the controller of the control module 301a initialises the one or more manipulated variable move trajectories and uses the model, the received data, the estimated current state and the desired future state to solve a dynamic optimisation problem to calculate one or more new manipulated variable move trajectories for the control module 301a.

Further, in stage 821, the controller of the control module 301b initialises the one or more manipulated variable move trajectories and uses the model, the received data, the estimated current state and the desired future state to solve a dynamic optimisation problem to calculate one or more new manipulated variable move trajectories for the control module 301b.

This means that the manipulated variable move trajectories are initialised locally in the controllers 310a, 310b of the control modules 301a and 301b. In addition, the dynamic optimisation problems are solved and new MV move trajectories are calculated for the local control modules 301a, 301b. In particular, each dynamic optimiser of the controllers 310a, 310b calculates an optimal move trajectory for its associated manipulated variables. In the example implementation of FIGS. 5 and 6, for the control module 301a this will be the furnace feed 513 and furnace COT 514, and for the control module 301b, it will be the C2-splitter bottom temperature 549 and C2 splitter bottom flow 547.

The initialisation of stages 819, 821 initialises the manipulated variable move trajectories to v(0) and sets prior feasible iterations to v(p)=v(0). In one example implementation, the initialisation is achieved by a warm start method in which the initial manipulated variable move trajectory is set equal to the optimal design from a previous control cycle, with the trajectory shifted by one-time step. The value at the last step may be chosen in a variety of ways, such as by setting it to the target value, the linear-quadratic regulator (LQR) control move or by maintaining the value from the previous control cycle. In an alternative arrangement, initialisation may be achieved using an LQR controller designed using well known methods. The cost resulting from the LQR trajectory may be compared to the warm start cost and the lower of the two options is selected. The LQR trajectory may be generated sequentially using the central feedback gain, manipulated variable hard constraints are imposed by clipping the trajectory using will understood methods.

The solving of the dynamic optimisation problem of stages 819, 821 involves solving the shared objective function for the process as an optimisation problem using the one or more manipulated variables of the associated sub-process as an independent variable, and the one or more updated manipulated variable move trajectories from the another control module 301a, 301b as disturbance variables. The optimisation problem is solved subject to limit constrains on the controlled and manipulated variables and variable tuning parameters received in stages 801 and 807. The manipulated variables may be optimisation variables that are adjusted by the controller to achieve the optimal feasible solution. The controlled variables may be dependent variables that move as a result of changes to the optimisation variables. The model defines the relationship between the controlled and manipulated variables, therefore the model, optionally along with the tuning weights, defines the objective function that is minimised by the controller. The optimisation problem may be solved using an appropriate constrained optimisation technique such as an interior point method.

In stage 823, the control module 301a transmits the new one or more manipulated variable move trajectories to the control module 301b. In stage 825, the control module 301b transmits the new one or more manipulated variable move trajectories to the control module 301a. The transmission of manipulated variable move trajectories may be performed via the message broker 319 (FIG. 6) and the manipulated variable move trajectories may be transmitted using assigned unique tag identification.

In stage 827, the control module 301a resolves the dynamic optimisation problem of stage 819 to calculate one or more new manipulated variable move trajectories. In stage 829, the control module 301b resolves the dynamic optimisation problem of stage 819 to calculate one or more new manipulated variable move trajectories.

This means that all required manipulated variable and measured disturbance variable future trajectories are retrieved from the message broker 319 and used to re-solve the dynamic optimization problem. In the example implementation of FIGS. 5 and 6 this means that the control module 301a retrieves manipulated move trajectory data for 521, 535, 537, 547, and the control module 301b retrieves manipulated variable move trajectory data for 513 and 535. Having retrieved the required manipulated variable move trajectory data, each control module 301a, 310b then re-solves its dynamic optimisation.

The optimisation solution given by solving the optimisation problem thus provides new manipulated variable move trajectories as new feasible iterations v(*). Given the prior feasible iterations v(p) and new iterations v(*) the next iterations v(p+1) may be calculated as weighted sums of v(p) and v(*).

A plurality of iterations of stages 823 to 829 are performed until a termination condition is detected. If a termination condition is reached then the optimal solution may be set to v=v(p+1) and the control cycle exits, otherwise the controller sets v(p)=v(p+1) and performs a new iteration. The number of iterations per control cycle may be determined by at least one of the available execution time, whether a pre-set total iteration count is reached or whether a convergence criteria is achieved.

This means that stages 823 to 829 are repeated until a termination condition is detected. In particular, each control module 301a, 310b will repeat the cycle of retrieving manipulated variable move-trajectory data and re-solving the dynamic optimisation until either a convergence condition is detected, or the assigned execution time has elapsed.

In stages 831 and 833, the control signals are transmitted from the control modules 301a, 301b to the process 500 so that the process may be controlled. In more detail in reference to the example implementation of FIGS. 5 and 6, a first step in each manipulated variable move plan (trajectory) is sent to the associated interface function block 307a,b, 308a, b, 309a,b, 316a,b, 318a to be written to the process. In particular, when each local control module 301a, 301b has terminated successfully, the first step in the most recently computed move plan for each manipulated variable is transmitted to the associated interface function block 307a,b 308a,b 309a,b 316a,b 318a where it will be validated before transmitting to the associated field instrument. The control modules 301a, 301b then wait for the next control cycle. In particular, having completed the control cycle, the control modules 301a, 301b remain dormant until the next control cycle is initiated.

It will be appreciated that the above implementation focuses on the cooperative control of only two control modules 301a, 301b. The exact stages of the control cycle will vary dependent on how many control modules 301a-301e are provided, but will follow the same general procedure as outlined above.

It will also be appreciated, that additional requirements may be enforced in the solution of the optimisation problem to establish closed loop stability. For example, in some implementations the control horizon must be sufficiently long to stabilize unstable modes at the end of the horizon. In other implementations terminal penalty or terminal region constraints on unstable modes are adopted using established techniques. All variables may be subject to tuning parameters which define the penalty cost control weights. Collectively these limits and tuning parameters along with the model define the objective function for each control module. Each controller may solve a control problem at each control cycle which entails minimisation of the objective function.

Further, the control limits and tuning parameters may be consistent and/or constant for the entire process control system, even when variables are shared between separate control modules. This consistency, coupled with the interactions that exist between the sub-systems may lead to a shared objective function.

Further still, the shared objective function may be subject to validity limits on controlled variables that may represent physical limits on the range of the associated sensor. If strictly enforced, these physical limits may, in some implementations, result in infeasibility of the control optimisation. To ensure feasibility and convergence of cooperative iterations, the hard validity limits may be represented by an appropriate smooth barrier function using well known methods such as the Kreisselmeier-Steinhauser function.

It will be appreciated that the process control system of the present invention is not limited to the ethylene process. Instead, the process control system may be used in any reasonable process and in particular industrial process, e.g. in an industrial plant. The sub-processes may be geographically dispersed A geographically dispersed process may be a utility network such as an electrical grid, gas distribution network or water supply network. In the case of a gas or water distribution network the sub-processes will be suppliers and consumers connected to the supply pipeline.

An example of an electrical grid is a micro grid which is isolated from the main grid and includes a number of electrical generators. There may be a range of different generators connected to the network and all capable of producing electrical power. But different generators may operate at different costs and have different environmental impact. For example, there may be wind turbines and solar cells as well as diesel generators which are more flexible but operate with higher cost and higher emissions. The objective is to generate power to meet demand at the lowest total cost and within emissions limits.

It would be possible to optimise the grid with a centralised optimiser that looked at the efficiency and generating capacity of each unit and coordinated the overall operation to maintain the required power. But this centralised optimiser could be complex to develop and maintain and is invalidated if new generators are added to the grid.

With cooperative distributed control according to aspects of the present invention, each generator may be treated as a separate sub-system with a control module. Each control module collaborates with others in the network so that collectively they agree on the best way to generate the required amount of power. If there is a disruption to the grid or one generator drops out, the remaining modules are able to quickly re-coordinate to maintain the overall system. When a new generator is added it can be quickly assimilated into the network.

In some example implementations, the controllers of the control modules are derived from a plurality of proportional integral derivative, PID, controllers. In some example implementations, the process control system may be implemented using an IEC 61131 architecture or an IEC 61499 architecture. In some example implementations, the control modules may be separate physical hardware modules (e.g. devices) on a common communication network. Alternatively, all of the control modules can reside on the same hardware module (e.g. a single device).

In some example implementations, the process control system may further comprise a centralised visualisation tool, e.g. a human-machine interface. The visualisation tool may be used to integrate data form any source into the process control system and present it in a consistent manner. The visualisation tool may be used to view and document the centralised model, network topology, process variables, limits and tuning parameters. Individual process variables may be identified by their tag name. In example implementations, the centralised view is assembled automatically by identifying the process variables associated with each control module along with the model interactions, tuning parameters and limits.

In summary, there is provided a process control system for controlling a process comprising a plurality of sub-processes, the process control system comprising a plurality of control modules 301a, 301b each associated with one of the plurality of sub-processes. At least one of the plurality of control modules 301a comprises: a model, a communicator 305a, and a controller 310a. The model comprises a sub-process model defining a relationship between variables of the associated sub-process, and an inter-sub-process model defining a relationship between a variable of another sub-process and at least one of the variables of the associated sub-process. The communicator 305a communicates with control module 301b associated with the another sub-process so as to determine an updated value for the variable of the another sub-process. The controller 310a uses the model and the updated value to determine a control signal for adjusting a manipulated variable of the associated sub-process. A process control method performed by the process control system.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others. Furthermore, references to "a", "the" means "at least one" unless specified otherwise.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A process control system for controlling a process comprising a plurality of sub-processes, the process control system comprising a plurality of control modules each associated with one of the plurality of sub-processes, wherein at least one of the plurality of control modules comprises:
   a model comprising a sub-process model defining a relationship between variables of the associated sub-process, and an inter-sub-process model defining a relationship between a variable of another sub-process and at least one of the variables of the associated sub-process;
   a communicator operable to communicate with a control module associated with the another sub-process so as to determine an updated value for the variable of the another sub-process; and
   a controller operable to use the model and the updated value to determine a control signal for adjusting a manipulated variable of the associated sub-process,
wherein the variable of the another sub-process is a manipulated variable, and the updated value is a move trajectory for the manipulated variable of the another sub-process, and wherein the controller is operable to use the model and the updated value to determine a move trajectory for the manipulated variable of the associated sub-process.

2. The process control system as claimed in claim 1, further comprising an actuator for controlling the manipulated variable of the associated sub-process, the actuator being operable to receive the control signal and control the manipulated variable based on the received control signal.

3. The process control system as claimed in claim 1, wherein the control modules are operable to communicate with one another in a cooperative manner to solve a shared objective function for the process.

4. The process control system as claimed in claim 1, wherein the communicator is operable to transmit information regarding the control signal for adjusting the manipulated variable of the associated sub-process to the control module associated with the another sub-process, and wherein the control module associated with the another sub-process is operable to use the information and a model to determine a control signal for adjusting a manipulated variable of the another sub-process.

5. The process control system as claimed in claim 1, wherein the controller comprises a state estimator operable to determine state information indicating the current state of the associated sub-process.

6. The process control system as claimed in claim 5, wherein a dynamic optimizer is operable to use a sub-set of the model to determine the control signal for adjusting a manipulated variable of the associated sub-process, and/or wherein a steady-state optimizer is operable to use information regarding coupled constraints between the associated sub-process and the another sub-process to determine the desired future state of the associated sub-process.

7. The process control system as claimed in claim 1, wherein the process control system further comprises a storage unit arranged to store information shared by the plurality of control modules, and wherein the plurality of control modules are in communication with the storage unit.

8. A process control system for controlling a process comprising a plurality of sub-processes, the process control system comprising a plurality of control modules each associated with one of the plurality of sub-processes, wherein at least one of the plurality of control modules comprises:
   a model comprising a sub-process model defining a relationship between variables of the associated sub-process, and an inter-sub-process model defining a relationship between a variable of another sub-process and at least one of the variables of the associated sub-process;
   a communicator operable to communicate with a control module associated with the another sub-process so as to determine an updated value for the variable of the another sub-process; and
   a controller operable to use the model and the updated value to determine a control signal for adjusting a manipulated variable of the associated sub-process,
wherein the process control system is operable to execute a plurality of control cycles, each control cycle comprising a plurality of iterations,
wherein during each iteration, the control module is operable to communicate with the control module associated with the another sub-process to receive an updated value from the another control module, and use the model and the updated value to determine the control signal for adjusting a manipulated variable of the associated sub-process, and wherein during each iteration, the controller is operable to solve a shared objective function for the process as an optimization problem using the manipulated variable of the associated sub-process as an independent variable, and the updated value from the another control module as a disturbance variable.

9. A process control system for controlling a process comprising a plurality of sub-processes, the process control system comprising a plurality of control modules each associated with one of the plurality of sub-processes, wherein at least one of the plurality of control modules comprises:
   a model comprising a sub-process model defining a relationship between variables of the associated sub-process, and an inter-sub-process model defining a relationship between a variable of another sub-process and at least one of the variables of the associated sub-process;
   a communicator operable to communicate with a control module associated with the another sub-process so as to determine an updated value for the variable of the another sub-process; and
   a controller operable to use the model and the updated value to determine a control signal for adjusting a manipulated variable of the associated sub-process,
wherein each of the plurality of control modules comprises:
   a model comprising a sub-process model defining a relationship between variables of the associated sub-process, and an inter-sub-process model defining a relationship between a variable of another sub-process and at least one of the variables of the associated sub-process;
a communicator operable to communicate with a control module associated with the another sub-process so as to determine updated values for the variable of the another sub-process; and
a controller operable to use the model and the updated value to determine a control signal for adjusting a manipulated variable of the associated sub-process.

10. A process control system for controlling a process comprising a plurality of sub-processes, the process control system comprising a plurality of control modules each associated with one of the plurality of sub-processes, wherein at least one of the plurality of control modules comprises:
   a model comprising a sub-process model defining a relationship between variables of the associated sub-process, and an inter-sub-process model defining a relationship between a variable of another sub-process and at least one of the variables of the associated sub-process;
   a communicator operable to communicate with a control module associated with the another sub-process so as to determine an updated value for the variable of the another sub-process; and
   a controller operable to use the model and the updated value to determine a control signal for adjusting a manipulated variable of the associated sub-process,
wherein the model comprises a cooperative model and a non-cooperative model, and
wherein the non-cooperative model defines a relationship between a manipulated variable and a controlled variable that will not be used to control the controlled variable.

11. A process control system for controlling a process comprising a plurality of sub-processes, the process control system comprising a plurality of control modules each associated with one of the plurality of sub-processes, wherein at least one of the plurality of control modules comprises:
   a model comprising a sub-process model defining a relationship between variables of the associated sub-process, and an inter-sub-process model defining a relationship between a variable of another sub-process and at least one of the variables of the associated sub-process;
   a communicator operable to communicate with a control module associated with the another sub-process so as to determine an updated value for the variable of the another sub-process; and
   a controller operable to use the model and the updated value to determine a control signal for adjusting a manipulated variable of the associated sub-process,
wherein the process control system further comprises a central configurator, the central configurator being operable to generate a centralized model defining the interactions between variables in the process, and
wherein the model is derived from the centralized model.

12. A process control system for controlling a process comprising a plurality of sub-processes, the process control system comprising a plurality of control modules each associated with one of the plurality of sub-processes, wherein at least one of the plurality of control modules comprises:
   a model comprising a sub-process model defining a relationship between variables of the associated sub-process, and an inter-sub-process model defining a relationship between a variable of another sub-process and at least one of the variables of the associated sub-process;
   a communicator operable to communicate with a control module associated with the another sub-process so as to determine an updated value for the variable of the another sub-process; and
   a controller operable to use the model and the updated value to determine a control signal for adjusting a manipulated variable of the associated sub-process,
wherein the process control system further comprises a central configurator, the central configurator being operable to generate a centralized model defining the interactions between variables in the process, and
wherein the model is derived from the centralized model, and
wherein the central configurator is operable to update the centralized model in response to a variable or a control module being added to or removed from the process control system.

13. A process control system for controlling a process comprising a plurality of sub-processes, the process control system comprising a plurality of control modules each associated with one of the plurality of sub-processes, wherein at least one of the plurality of control modules comprises:
   a model comprising a sub-process model defining a relationship between variables of the associated sub-process, and an inter-sub-process model defining a relationship between a variable of another sub-process and at least one of the variables of the associated sub-process;
   a communicator operable to communicate with a control module associated with the another sub-process so as to determine an updated value for the variable of the another sub-process; and
   a controller operable to use the model and the updated value to determine a control signal for adjusting a manipulated variable of the associated sub-process,
wherein the controller comprises a state estimator operable to determine state information indicating the current state of the associated sub-process, and
wherein the controller comprises a steady-state optimizer operable to determine a desired future state of the associated sub-process using the state information.

14. A process control system for controlling a process comprising a plurality of sub-processes, the process control system comprising a plurality of control modules each associated with one of the plurality of sub-processes, wherein at least one of the plurality of control modules comprises:
   a model comprising a sub-process model defining a relationship between variables of the associated sub-process, and an inter-sub-process model defining a relationship between a variable of another sub-process and at least one of the variables of the associated sub-process;
   a communicator operable to communicate with a control module associated with the another sub-process so as to determine an updated value for the variable of the another sub-process; and
   a controller operable to use the model and the updated value to determine a control signal for adjusting a manipulated variable of the associated sub-process,
wherein the controller comprises a state estimator operable to determine state information indicating the current state of the associated sub-process, wherein the controller comprises a steady-state optimizer operable to determine a desired future state of the associated sub-process using the state information, and wherein the controller comprises a dynamic optimizer operable to use the model and the updated value to determine the control signal for adjusting a manipulated variable of the associated sub-process.

15. A process control method for controlling a process comprising a plurality of sub-processes, the process control method performed by a control module associated with one of the plurality of sub-processes, wherein the process control method comprises:

providing a model comprising a sub-process model defining a relationship between variables of the associated sub-process, and an inter-sub-process model defining a relationship between a variable of another sub-process and at least one of the variables of the associated sub-process;

receiving, from another control module associated with the another sub-process, an updated value for the variable of the another sub-process;

using the model and the updated value to determine a control signal for adjusting a manipulated variable of the associated sub-process, wherein the variable of the another sub-process is a manipulated variable, and the updated value is a move trajectory for the manipulated variable of the another sub-process, and wherein the controller is operable to use the model and the updated value to determine a move trajectory for the manipulated variable of the associated sub-process.

16. A computer readable medium having instructions recorded thereon which, when executed by a processor device, cause the processor device to perform the method of claim 15.

* * * * *